(12) United States Patent
Kainer et al.

(10) Patent No.: US 8,958,079 B2
(45) Date of Patent: Feb. 17, 2015

(54) SYSTEM AND METHOD FOR INSPECTING RAILROAD TIES

(71) Applicant: Georgetown Rail Equipment Company, Georgetown, TX (US)

(72) Inventors: John J. Kainer, Georgetown, TX (US); Charles W. Aaron, Georgetown, TX (US); Gregory T. Grissom, Georgetown, TX (US); Antonio R. Mauricio, Round Rock, TX (US); Jeb E. Belcher, Austin, TX (US); David M. Pagliuco, Georgetown, TX (US); Wilson T. Wamani, Round Rock, TX (US); John A. Nagel, II, Cedar Park, TX (US); Christopher M. Villar, Liberty Hill, TX (US); Steven C. Orrel, Georgetown, TX (US); Zechariah Bertilson, Plymouth, MN (US)

(73) Assignee: Georgetown Rail Equipment Company, Georgetown, TX (US)

( * ) Notice: Subject to any disclaimer, the term of this patent is extended or adjusted under 35 U.S.C. 154(b) by 128 days.

(21) Appl. No.: 13/795,841

(22) Filed: Mar. 12, 2013

(65) Prior Publication Data
US 2013/0191070 A1 Jul. 25, 2013

Related U.S. Application Data

(63) Continuation-in-part of application No. 12/465,473, filed on May 13, 2009, now Pat. No. 8,405,837, which
(Continued)

(51) Int. Cl.
*G01B 11/14* (2006.01)
*G01B 11/24* (2006.01)
(Continued)

(52) U.S. Cl.
CPC . *G01B 11/24* (2013.01); *B61K 9/08* (2013.01); *G01C 3/08* (2013.01)

USPC ................................. 356/625; 356/614

(58) Field of Classification Search
CPC .......... B61C 17/12; B61K 9/08; B61K 13/00; B61F 5/122; B61F 5/26; B61F 5/30; B61F 5/308; B61F 5/38; B61F 5/40; B61F 5/50; B61L 15/0036; B61L 23/044; B61L 23/047; B61L 25/025; B61L 3/006
See application file for complete search history.

(56) References Cited

U.S. PATENT DOCUMENTS 3,942,000 A   3/1976 Dieringer
4,040,738 A * 8/1977 Wagner ...................... 356/3.06
(Continued)

FOREIGN PATENT DOCUMENTS

DE        10040139 A1    3/2002
FR        2674809        10/1992
(Continued)

OTHER PUBLICATIONS

Search Report issued in European Patent Application No. EP 05767776.7 dated May 2, 2011.
(Continued)

*Primary Examiner* — Michael P Stafira
(74) *Attorney, Agent, or Firm* — Parsons Behle & Latimer

(57) ABSTRACT

A system for inspecting railroad ties in a railroad track includes a light generator, an optical receiver and a processor. The light generator is oriented to project a beam of light across the railroad track while moving along the railroad track in a travel direction. The optical receiver is oriented to receive at least a portion of the beam of light reflected from the railroad track and configured to generate image data representative of a profile of at least a portion of the railroad track. The processor is configured to analyze the image data by applying one or more algorithms configured to find boundaries of a railroad tie and determine one or more condition metrics associated with the railroad tie.

28 Claims, 11 Drawing Sheets

Related U.S. Application Data is a continuation-in-part of application No. 11/172,618, filed on Jun. 30, 2005, now Pat. No. 7,616,329.

(60) Provisional application No. 60/584,769, filed on Jun. 30, 2004.

(51) Int. Cl.
*B61K 9/08* (2006.01)
*G01C 3/08* (2006.01)

(56) References Cited

U.S. PATENT DOCUMENTS

| | | | | |
|---|---|---|---|---|
| 4,198,164 | A | * | 4/1980 | Cantor ............................ 356/623 |
| 4,265,545 | A | | 5/1981 | Slaker |
| 4,700,223 | A | | 10/1987 | Shoutaro et al. |
| 4,915,504 | A | * | 4/1990 | Thurston ........................ 356/604 |
| 5,199,176 | A | * | 4/1993 | Theurer et al. .................. 33/338 |
| 5,487,341 | A | * | 1/1996 | Newman et al. .............. 104/17.1 |
| 5,671,679 | A | | 9/1997 | Straub et al. |
| 5,721,685 | A | | 2/1998 | Holland et al. |
| 5,970,438 | A | * | 10/1999 | Clark et al. .................... 702/184 |
| 6,025,920 | A | | 2/2000 | Dec |
| 6,615,648 | B1 | | 9/2003 | Ferguson et al. |
| 6,647,891 | B2 | * | 11/2003 | Holmes et al. .................... 104/2 |
| 7,036,232 | B2 | | 5/2006 | Casagrande |
| 2002/0070283 | A1 | | 6/2002 | Young |
| 2002/0196456 | A1 | | 12/2002 | Komiya et al. |
| 2003/0140509 | A1 | | 7/2003 | Casagrande |
| 2004/0088891 | A1 | | 5/2004 | Theurer et al. |
| 2004/0122569 | A1 | | 6/2004 | Bidaud |
| 2006/0017911 | A1 | | 1/2006 | Villar et al. |
| 2006/0171704 | A1 | | 8/2006 | Bingle |
| 2008/0304083 | A1 | * | 12/2008 | Farritor et al. ................. 356/614 |

FOREIGN PATENT DOCUMENTS

| | | |
|---|---|---|
| JP | 06-322707 | 11/1994 |
| JP | 07-146131 | 6/1995 |
| JP | 07-294443 | 11/1995 |
| JP | 07-294444 | 11/1995 |
| JP | 09-24828 | 1/1997 |
| JP | 10-332324 | 12/1998 |
| JP | 11-172606 | 6/1999 |
| JP | 2000221146 A1 | 8/2000 |
| JP | 2000-241360 | 9/2000 |
| JP | 2002-294610 | 10/2002 |
| JP | 2003-74004 | 3/2003 |
| JP | 2004-132881 | 4/2004 |
| RU | 1418105 | 8/1988 |
| RU | 2142892 | 12/1999 |

OTHER PUBLICATIONS

Decision on Grant, dated Oct. 22, 2009, for corresponding Russian Patent Application No. 2007103331.

Final Office Action issued in U.S. Appl. No. 12/465,473, dated Jul. 31, 2012.

Office Action issued in U.S. Appl. No. 12/465,473, dated Oct. 5, 2011.

Office Action issued in U.S. Appl. No. 11/172,618, dated Mar. 23, 2007.

Final Office Action issued in U.S. Appl. No. 11/172,618, dated Oct. 5, 2007.

Office Action issued in U.S. Appl. No. 11/172,618, dated Aug. 5, 2008.

Final Office Action issued in U.S. Appl. No. 11/172,618, dated Apr. 15, 2009.

* cited by examiner

SYSTEM AND METHOD FOR INSPECTING RAILROAD TIES

PRIORITY CLAIM

This application is a continuation-in-part of U.S. application Ser. No. 12/465,473, entitled "SYSTEM AND METHOD FOR INSPECTING SURFACES USING OPTICAL WAVELENGTH FILTERING," filed May 13, 2009, which is a continuation-in-part of U.S. application Ser. No. 11/172,618, entitled, "SYSTEM AND METHOD FOR INSPECTING RAILROAD TRACK, filed Jun. 30, 2005, which is a non-provisional application claiming benefit of U.S. Provisional Application Ser. No. 60/584,769, also entitled, "SYSTEM AND METHOD FOR INSPECTING RAILROAD TRACK, filed Jun. 30, 2004, each being hereby incorporated by reference in their entirety.

BACKGROUND

1. Field of the Invention

The present invention relates generally to systems and methods for inspecting surfaces and, more particularly to systems and methods for inspection and grading of wood railroad ties.

2. Related Art

Railroads are generally constructed on a base layer of compacted, crushed stone material. A layer of gravel ballast rests on top of this stone layer. Crossties are laid in and on this ballast layer, and two parallel steel rails are attached to the crossties with fasteners. The majority of crossties in service are made of wood. Various other materials are used such as concrete, steel, and composite or recycled material in the manufacture of crossties. These alternative material crossties make up a relatively small percentage of all crossties. The crossties maintain the gage or lateral spacing of the rails. The crossties distribute the axle loads from the trains to the ballast layer below the crossties and contribute to the cushioning effect of the entire track structure. Over time, environmental factors can cause the crossties to deteriorate until they must be replaced. Annually, railroads in North America replace up to 2% or more of all wooden crossties. This constitutes several million crossties.

To manage the logistics of crosstie replacement and to quantify the need for new crossties, railroad inspectors attempt to grade the condition of crossties and the fastener system on a regular basis. This grading is most often done with a visual inspection to identify crossties and fasteners that are rotten, broken, split, or worn to an extent that their serviceable life is at its end. The process of visual inspection is quite time consuming. In practice, inspection of the track is performed by an inspector walking along the track to inspect and record the conditions of the crossties and/or fasteners, which are spaced approximately every 20-inches along the track. One particular North American railroad reports that a crew of 3 or 4 men can grade only about 5 to 7 miles of track per day.

Devices for inspecting rail are known in the art, and software for analyzing and organizing data obtained with such devices is known in the art. For example, TieInspect® by ZETA-TECH Associates, Inc. of New Jersey is a computerized crosstie inspection system having a hand held device and software. The handheld device is used by inspectors when walking along the track and surveying the track, and the software is used to analyze and organize the data obtained with the device. However, some prior railroad tie inspection and grading systems and methods have a variety of limitations in their use and present a variety concerns.

The present invention is directed to overcoming, or at least reducing the effects of, one or more of the problems set forth above, thereby providing a system capable of inspecting and grading railroad ties both night and day.

SUMMARY

It has been recognized that it would be advantageous to develop a fully computerized system and method for inspecting railroad tracks, which can both identify and locate railroad ties, tie plates, and appurtenant structures, and also determine condition metrics of the these.

It has also been recognized that it would be advantageous to have a system and method for inspecting railroad track that can provide a condition grade or score for railroad ties and other features.

It has also been recognized that it would be advantageous to have a system and method for inspecting railroad track that can automatically create a tie replacement plan.

In accordance with one embodiment thereof, the present invention provides a system for inspecting railroad ties in a railroad track, including a light generator, an optical receiver and a processor. The light generator is oriented to project a beam of light across the railroad track while moving along the railroad track in a travel direction. The optical receiver is oriented to receive at least a portion of the beam of light reflected from the railroad track and configured to generate image data representative of a profile of at least a portion of the railroad track. The processor is configured to analyze the image data by applying one or more algorithms configured to find boundaries of a railroad tie and determine one or more condition metrics associated with the railroad tie.

In one specific embodiment, the processor is further configured to apply a weight factor to each condition metric of the railroad tie and compute a condition grade for the tie based on the weighted condition metrics.

In another specific embodiment, the tie condition grade, tie location and spacing between ties with a tie condition grade above or below a grade threshold are correlated to create a tie replacement plan.

In accordance with another aspect thereof, the invention provides a system for inspecting railroad ties, including a rail vehicle, a light generator, an optical receiver and a processor. The rail vehicle is configured for moving along a railroad track in a travel direction. The light generator is attached to the rail vehicle, and is oriented to project a beam of light across the railroad track while moving thereon. The optical receiver is attached to the rail vehicle, and oriented to receive at least a portion of the beam of light reflected from the railroad track and configured to generate image data representative of a profile of at least a portion of the railroad track. The processor is configured to analyze the image data by applying one or more algorithms configured to find boundaries of railroad ties in the railroad track and determine a condition of each railroad tie.

In accordance with yet another aspect thereof, the invention provides a method for inspecting railroad ties. The method includes scanning a set of railroad ties with an optical scanning system to produce image data, analyzing the image data using a processor running a machine vision algorithm, identifying, via the processor, boundaries of railroad ties in the set of railroad ties, and determining, via the processor, condition metrics for each railroad tie in the set of railroad ties.

In accordance with still another aspect thereof, the invention provides a method for grading railroad ties of a railroad track in situ. The method includes scanning a set of railroad ties with an optical scanning system and generating image signals representing the railroad ties, applying, via a computer processor, a machine vision algorithm to the image signals and generating a 3-D profile of the railroad ties that locates tie features, analyzing the 3-D profile via a computer processor to determine a set of condition metrics representing each railroad tie in the set of railroad ties, and computing a condition grade for each railroad tie based on a weighted summation of the condition metrics

BRIEF DESCRIPTION OF THE DRAWINGS

Additional features and advantages of the invention will be apparent from the detailed description which follows, taken in conjunction with the accompanying drawings, which together illustrate, by way of example, features of the invention, and wherein.

Figure 1:
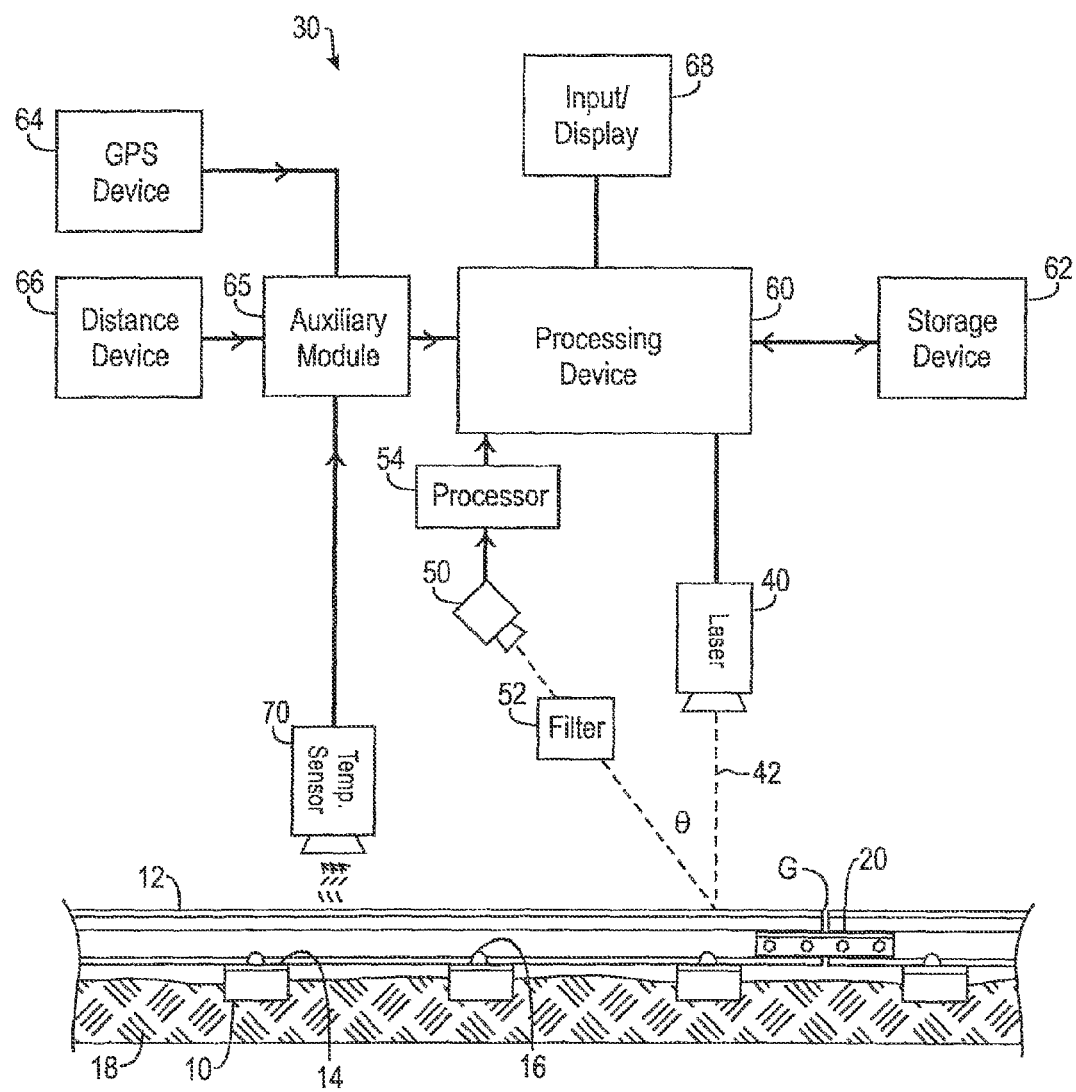
FIG. 1 schematically illustrates an embodiment of the disclosed inspection system.

While the disclosed inspection system and associated methods are susceptible to various modifications and alternative forms, specific embodiments thereof have been shown by way of example in the drawings and are herein described in detail. The figures and written description are not intended to limit the scope of the disclosed inventive concepts in any manner. Rather, the figures and written description are provided to illustrate the disclosed inventive concepts to a person skilled in the art by reference to particular embodiments, as required by 35 U.S.C. §112.

DETAILED DESCRIPTION

Reference will now be made to exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

Figure 2:
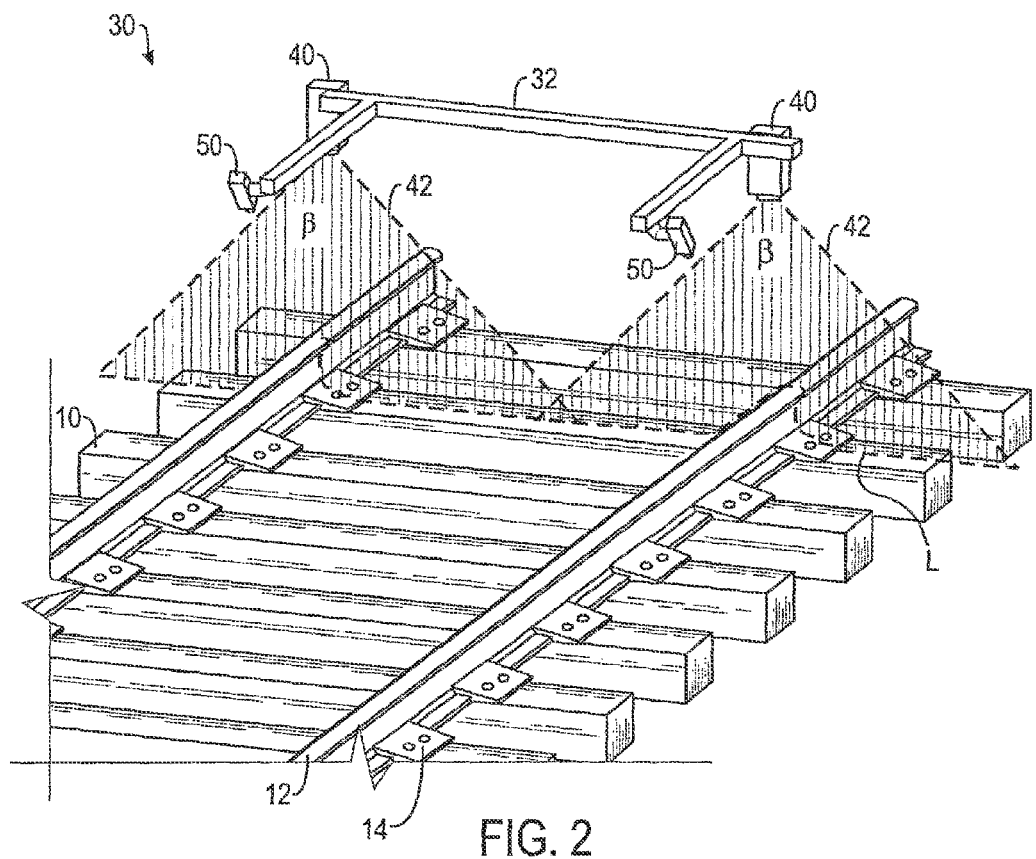
FIG. 2 illustrates a portion of an embodiment of a system for inspecting railroad track according to certain teachings of the present disclosure.

Referring to FIGS. 1 and 2, an exemplary embodiment of a system 30 for inspecting railroad track according to certain teachings of the present disclosure is illustrated. In FIG. 1, the disclosed inspection system 30 is schematically illustrated relative to a railroad track. In FIG. 2, a portion of the disclosed inspection system 30 is illustrated in a perspective view relative to railroad track.

As best shown in FIG. 1, the exemplary disclosed inspection system 30 includes a light generator such as a laser 40, a device for receiving light reflected from the area to be inspected such as a camera 50, and a processing device 60. In the implementation shown in FIG. 1, the disclosed inspection system 30 is used to survey the track bed of a railroad track. Although the disclosed inspection system and associated methods are described for use in inspecting railroad track, it will be appreciated with the benefit of the present disclosure that the disclosed system and method can be used in other areas and in industries where surfaces or components are inspected. For example, the disclosed inspection system and method can be used to inspect roads, electrical lines, piping, or other networks or systems.

The track bed includes crossties 10, rails 12, tie plates 14, spikes 16, and ballast 18. Briefly, the laser 40 projects a beam 42 of laser light at the track bed. The beam 42 produces a projected line L, shown in FIG. 2, on the track bed that follows the contours of the surfaces and components of the track bed. The light receiver, camera 50, captures an image of the line L of laser light 42 projected on the track bed. The camera 50 sends the captured image to the processing device 60 for processing and analysis as described in more detail below.

As best shown in exemplary embodiment of FIG. 2, pairs of lasers 40 and cameras 50 are positioned above each one of the rails 12 of the track. The lasers 40 and the cameras 50 can be assembled onto a rigid framework 32, which can be mounted on an inspection vehicle (not shown) or other device moving along the track so as to maintain the inspection system 30 in the proper position. Only a portion of the framework 32 is shown in FIG. 2 for simplicity. However, it is understood that other known components for the framework 32 may be needed to mount the lasers 40 and the cameras 50 on an inspection vehicle.

In general, the inspection vehicle can be any suitable vehicle for traveling along the railroad track. For example, a common practice in the art is to equip a normal highway vehicle, such as a pick-up truck, with "hi-rail" gear mounted to the frame of the vehicle. Hi-rail gear typically includes a set of undersized railroad stock wheels that allow the highway vehicle to ride along the rails. In one embodiment, then, the framework 32 of the disclosed inspection system 30 can be mounted in the bed of a pick-up truck having "hi-rail" gear. Alternatively, the inspection vehicle can be maintenance of way (MoW) equipment that is specifically designed for working along the railroad track. In addition, the disclosed inspection system 30 can be mounted on a chassis that is towed by a vehicle or can be mounted on a locomotive or freight car.

As best shown in FIG. 2, the lasers 40 project a beam 42 of light having a predetermined angular spread .beta. The angular spreads .beta. of the two lasers 40 cover substantially the entire surface of the track bed. In this way, the lasers 40 produce a projected line L that is substantially straight and extends substantially across the track bed. Each laser 40 preferably produces a beam 42 having an angular spread .beta. of about 60-degrees and covers approximately one half of the track bed. Preferably, the lasers 40 project the beam 42 substantially perpendicular to the surface of the track. Alternatively, a single laser could be used that is positioned such as to create the projected line L across the track bed.

In addition, the lasers 40 are preferably infrared lasers having 4-watts of optical output and producing light at an infrared wavelength of about 810-nm. The relatively high optical output of the lasers 40 helps reduce effects of ambient light so that shielding is not necessary. A suitable laser for the disclosed inspection system 30 includes a Magnum laser manufactured by Stocker Yale. The parameters described above for the lasers 40 are preferred for inspecting the surface of a railroad track. However, those ordinarily skilled in the art having the benefit of this disclosure realize the present invention may be utilized to inspect a variety of other surfaces. Other implementations of the disclosed inspection system 30 can use an alternate number of light sources as well as different wavelengths, optical outputs, and angular spreads.

As best shown in FIG. 2, the cameras 50 are positioned adjacent the lasers 40. As best shown in FIG. 1, the cameras 50 are mounted at an angle .theta. with respect to the beam 42 of light projected from the lasers 40. In one embodiment, the cameras are positioned at an angle .theta. of about 60-degrees. As the disclosed inspection system 30 is moved along the track, the cameras 50 capture an image or frame of the track bed at small, regular increments. Preferably, the cameras 50 are capable of a substantially high frame rate, such as about 5405 frames per second.

Each still image or frame captured by the cameras 50 is then filtered and processed to isolate the contoured laser line L projected on the track bed. The cameras 50 are fitted with band-pass filters 52 that allow only the radiant energy substantially at the preferred infrared wavelength of the lasers 40 to pass. Because the wavelength of the lasers 40 is about 810-nm, the band-pass filters 52 of the cameras 50 can eliminate substantially all ambient light so that the camera 50 acquires a substantially clear, still image of the projected line L of light from the lasers 40.

Each of the two cameras 50 send image data directly to the processing device or computer 60 via wired or wireless transmission lines. Preferably, the camera 50 includes a processor 54 capable of converting or formatting the captured image of the projected line L into a dimensional profile that is sent directly to the processing device or computer 60. The ability of the camera 50 to process or format the captured image in this way can eliminate the need for expensive post processors or high-speed frame grabbers. A suitable camera for the disclosed inspection system 30 having such processing abilities includes a Ranger M50 manufactured by IVP Integrated Vision Products, Inc.

Among other common components, the processing device or computer 60 includes a microprocessor, inputs, outputs, and a data storage device 62. The data storage device 62 can include a hard drive, a non-volatile storage medium, a flash memory, tape, or CD-ROM. The processing device 60 can further include an input/display 68 for a track inspector to input and review data and to operate the disclosed inspection system 30. The processing device 60 operates with suitable software programs for storing and analyzing the various data obtained with the disclosed inspection system 30. For example, the processing device 60 can have any suitable image processing software, such as Matrox MIL, Common VisionBlox, Labview, eVision, and Halcon. For example, the processing device 60 can have image processing tools known in the art for analyzing image data from the cameras 50 such as Region of Interest (ROI) tools, filtering tools, blob tools, edge finders, histogram tools, and others.

To effectively process all of the data obtained with the disclosed inspection system 30, the processing device 60 in a preferred embodiment includes a computer having a fast processor, such as an Intel Pentium 4 processor capable of running at 2.8 GHz. To effectively store all of the data obtained with the disclosed inspection system 30, the storage device 62 preferably includes two large-capacity hard drives configured to use both read/write mechanisms simultaneously as one drive, which is also known as a Redundant Array of Independent Disks (RAID) system. The fast processor of the processing device 60 and the dual hard drives of the storage device 62 allow for sustained real-time storage of the data obtained with the disclosed inspection system 30. In a preferred embodiment, the power for the disclosed inspection system 30 can be provided by 110 V AC power from a belt driven generator running directly off the engine of the inspection vehicle.

Figure 3:
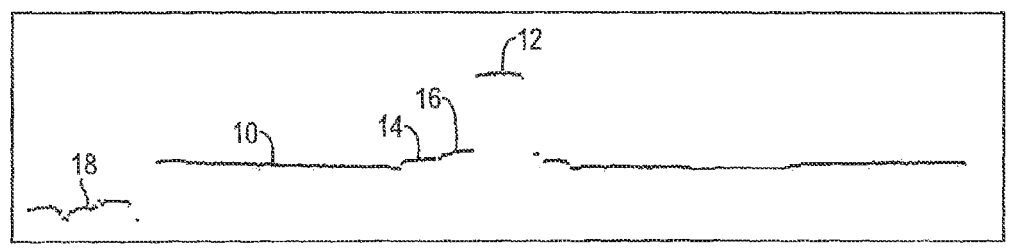
FIG. 3 illustrates an example frame of a portion of railroad track obtained with the disclosed inspection system.

With the beams 42 projected onto the irregular surface of the track and viewed at an angle, the projected line L shown in FIG. 2 follows the contours of the surface and components of the track bed. An example image or frame showing the projected line L of the track bed is shown in FIG. 3. The image data or frame includes a plurality of pixels given X-Y coordinates and shows a contour of the track bed captured by the cameras 50. Due to filtering and other image processing techniques known in the art, the image includes two pixel values, where the dark pixels represent the contour of the track bed. Every pixel of a given image data is given the same Z-coordinate, which represents the particular position along the length of the track at which the image data was captured. In this manner, a plurality of captured images produce a three-dimensional scan of the track bed in which each image of the scan has X-Y coordinates showing the contour of the track bed and has a Z-coordinate representing the particular position of the contour along the length of rail.

It is understood that the speed at which an image is captured is limited by the width and height of the scanned area, the distance between the discrete still images, the resolution of the still images, the maximum frame rate of the cameras 50, the processing speed of the computer 60, and the write speed of the data storage device 62. For a railroad application of the disclosed inspection system 30, one preferred example is spacing between still images or frames captured by the cameras 50 of about 0.1-inch, a preferred velocity of the inspection vehicle of about 30-mph, a preferred height of the scanned area of approximately 10 inches, and a preferred width of the scanned area of about 10-feet across the width of the track bed. To satisfy these preferred parameters, a camera system capable of about 5405 frames per second and a computer system capable of processing and recording at about 8.3 MPS is preferred. Each frame or image, such as shown in FIG. 3, may require about 1,536 bytes of storage. With a frame captured at about every 0.1-inches along the length of track, about 633,600 frames would be captured for one mile of track and would require 0.973 gigabytes of storage space.

Another embodiment and as shown in FIG. 1, the disclosed inspection system 30 may further include a Global Position System (GPS) receiver 64 for obtaining geographical locations of the inspection vehicle when inspecting the railroad track. The GPS receiver 64 can include any suitable GPS receiver known in the art for obtaining geographical locations. For example, the GPS receiver 64 can be an independent, commercially available unit mounted on the inspection vehicle and connected to the processing device 60 with a suitable cable connection and input/output interface. The GPS receiver 64 can obtain the geographical location using a differential or non-differential GPS system. Techniques for obtaining substantially accurate location and time data with a GPS receiver 64 are well known in the art and are not discussed further. The geographical locations are sent to the processing device 60 and can be compiled with the image data of the track bed.

When the image data from the cameras 50 is recorded, the geographical location of the frame can also be recorded. Eliminating a continuous stream of geographical location data from the GPS receiver 64 to the computer 60 can free the processor time available for capturing the image data with the processing device 60. Therefore, the GPS receiver 64 preferably feeds data to an auxiliary module 65. The auxiliary module 65 packages this data and sends the data to the processing device or computer 60 when queried. In addition to obtaining geographical location data, the GPS receiver 64 can obtain time data. Furthermore, the location and time data obtained with the GPS receiver 64 can be used to determine other variables, such as the speed of the inspection vehicle, which can be used for various purposes disclosed herein. Thus, the disclosed inspection system 30 can use data from the GPS receiver 64 to trigger the cameras 50 to capture a still image of the track bed at about every 0.1-inches along the rail.

In an alternative exemplary embodiment and as shown in FIG. 1, the disclosed inspection system 30 can include a distance device 66 for obtaining geographical locations of the inspection vehicle when inspecting the rail. The distance device 66 can be an encoder that counts wheel revolutions or partial revolutions as the inspection vehicle moves along the rail or can be the existing odometer sensor on the inspection vehicle. The distance device 66 can provide location data to the processing device 60. Using the distance device 66, the disclosed inspection system 30 can trigger the cameras 50 to capture a still image of the track bed at about every 0.1-inches along the rail.

In another exemplary embodiment, the disclosed inspection system 30 can capture still images of the track bed at or near the maximum frame rate of the cameras 50 without being triggered by the GPS receiver 64 or distance device 66. For example, the cameras 50 and processing device 60 can operate at or near the maximum frame rate while the inspection vehicle travels along the track. Using the known average width of a crosstie 10 or tie plate 14, the disclosed inspection system 30 can calculate the velocity of the inspection vehicle. The disclosed system can then delete any extra frames to reduce data storage so that the retained frames would have an approximate spacing of 0.1-inch. It is understood that exact spacing of 0.1-inch may not always be possible, but the spacing will be known and may be between 0.05" and 0.1". In this embodiment, the same number of frames are discarded between each retained frame on a given tie so that frame spacing remains uniform. For example, if the tie plates are known to be 8-inches wide and 244 frames are captured for a specific tie plate, then two frames can be discarded between each retained frame. If the entire set of frames were numbered 1 through 244, then the retained frames would be those numbered: 1, 4, 7, 10, . . . 241, 244. The retained 82 frames would have a calculated spacing of 0.098-inch.

Alternatively, the disclosed system could interpolate between any two captured frames to create a new third frame at any desired location along the track. Some frames could then be discarded to achieve the exact frame spacing desired.

After the disclosed inspection system 30 completes a survey of railroad track, computer analysis of the image data is performed. The computer analysis can be performed by the processing device or computer 60 located in the inspection vehicle. Alternatively, the computer analysis can be performed by another computer system having image processing software known in the art. The computer analysis searches the image data and determines or detects locations along the track where defects occur or where allowable tolerances of the railroad track are not maintained. For a particular implementation, the computer analysis can be customized or changed. The geographic locations of defects or unallowable tolerances can be provided so that appropriate repairs can be made or maintenance work can be scheduled.

A number of measurable aspects of the railroad track can be determined or detected from the image data of the track bed obtained with the disclosed inspection system and associated methods. In examples that follow, a number of such measurable aspects are discussed, and various techniques for analyzing the measurable aspects are disclosed. It will be appreciated that these and other measurable aspects of the railroad track can be determined or detected from the image data of the track bed obtained with the disclosed inspection system. In addition, it will be appreciated that other techniques known in the art for analyzing the image data can be used with the disclosed inspection system and associated methods, and that surfaces other than railroad components may be inspected. Accordingly, the disclosed inspection system and associated methods are not intended to be limited to railroad inspection or the measurable aspects and particular techniques described herein.

Figure 11:
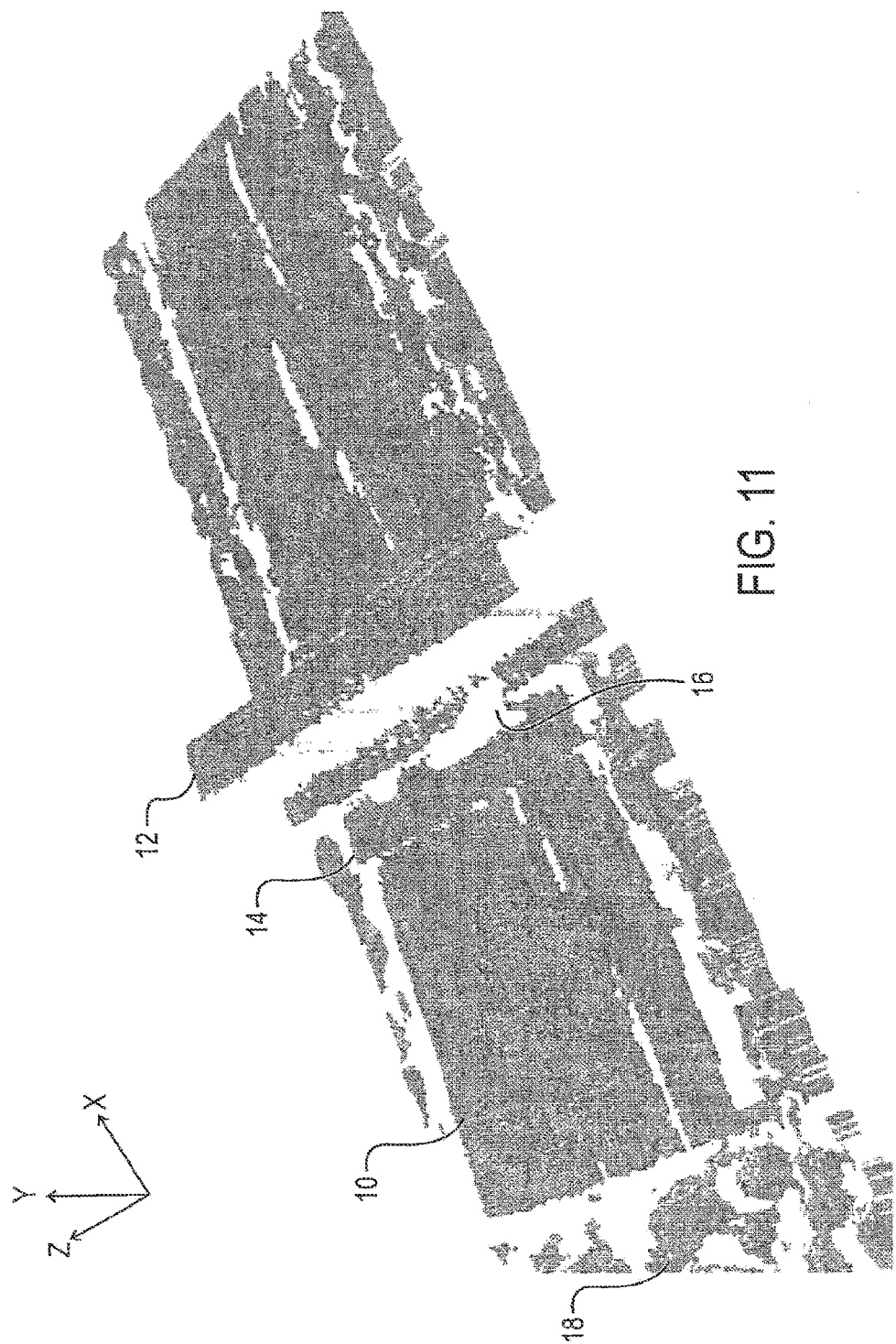
FIGS. 11 and 12 illustrate three-dimensional compilations of image data obtained with the disclosed inspection system.
Figure 12:

For clarity, FIGS. 11 and 12 illustrate example compilations of image data obtained with the disclosed inspection system and associated methods. FIG. 11 has a plurality of compiled image data showing a portion of a crosstie, tie plate, and rail in a perspective view. FIG. 12 has a plurality of compiled image data showing a more detailed perspective view. As can be seen in FIGS. 11-12, the compiled image data forms a three-dimensional representation (X, Y, and Z) of the area of the track bed. The representation has substantial detail, and various aspects of the components of the track bed can be measured. In FIGS. 11-12, for example, cracks or splits in the crosstie 10 are visible. Also, the height of the crosstie 10 with respect to the ballast layer 18 is visible. The orientation and heights of the tie plate 14 and rail 12 are visible. These and other details can be obtained with the disclosed inspection system and associated methods as described in more detail below.

Figure 4A:
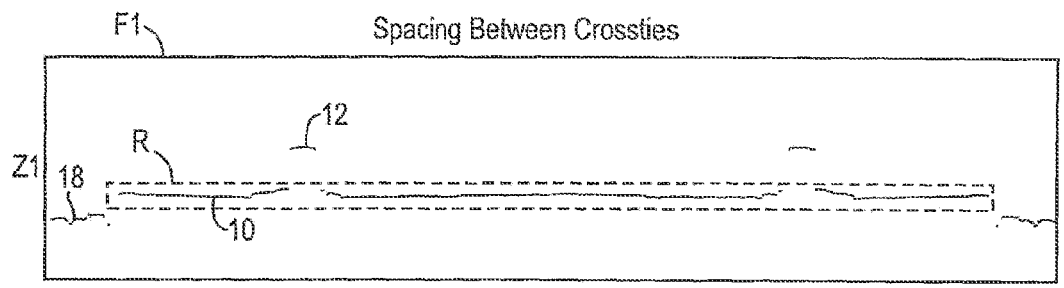
FIGS. 4A-4C illustrate example frames of railroad track obtained with the disclosed inspection system for determining the spacing between the crossties.
Figure 4B:
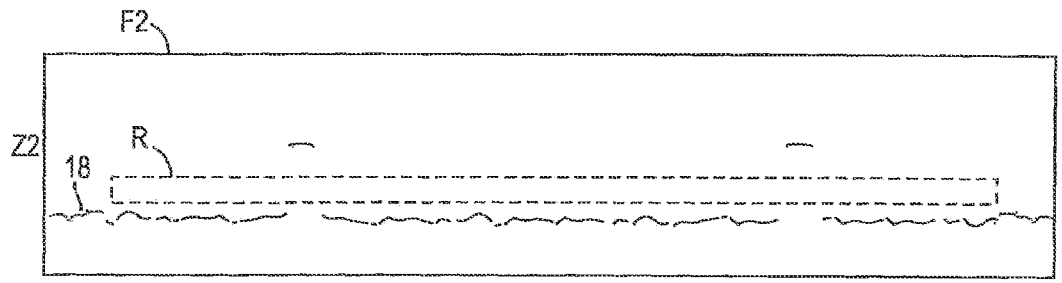
Figure 4C:
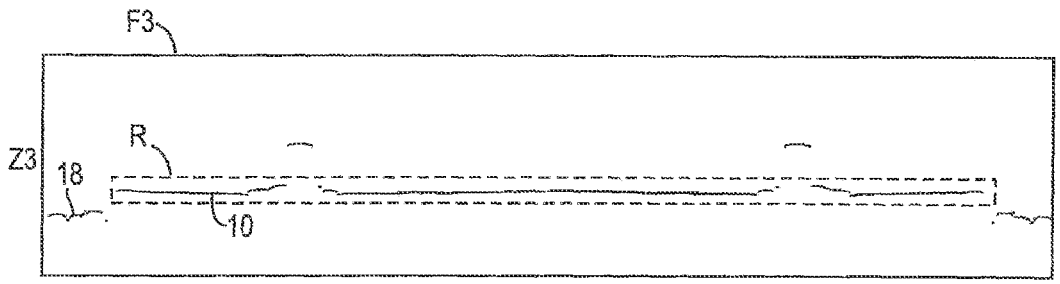

In one example, the spacing between crossties can be determined from the plurality of image data. Referring to FIGS. 4A-4C, example frames of the track bed obtained with the disclosed inspection system 30 are illustrated that can be used to determine the spacing between the crossties 10. FIG. 4A shows an end frame F1 having a contour of a first crosstie 10 that is at position Z1 along the track. This end frame F1 may designate the last frame showing this crosstie 10. FIG. 4B shows an intermediate frame F2 captured some time after the end frame F1 and at a further position Z2 along the track. This intermediate frame F2 lacks a crosstie because it designates a location between crossties of the track. It is understood that a plurality of such intermediate frames will follow the end frame F1 of FIG. 4A. FIG. 4C shows an end frame F3 having another crosstie 10' that is at further position Z3 along the track. Computer analysis can determine the spacing between crossties 10 and 10' by, for example, first counting the number of such intermediate frames F2 lacking a crosstie. This number of intermediate frames F2 can then be multiplied by the known spacing between frames (e.g., 0.1-inch) to calculate the distance between crossties 10 and 10'. In this way, a substantially accurate measurement between crossties of the track bed can be obtained without the need for a track inspector to physically inspect the crossties. Instead, the image data that forms the three-dimensional scan of the track bed is used.

Determining whether a frame has a crosstie or not can be performed by imaging techniques known in the art. For example and as shown in FIG. 4A-4C, the contour of a crosstie 10 is expected in a region of interest R of the frames F1-F3. Computer analysis can search the region of interest R of a frame for pixels indicating the presence of a crosstie. This can be done, for example, by averaging or summing the value of pixels in the region of interest R. Because the contour of the crosstie is composed of dark pixels, the region of interest R in a frame F1 having a crosstie 10 will have a greater average or sum than the region R in an intermediate frame F2 lacking a crosstie.

Figure 5:
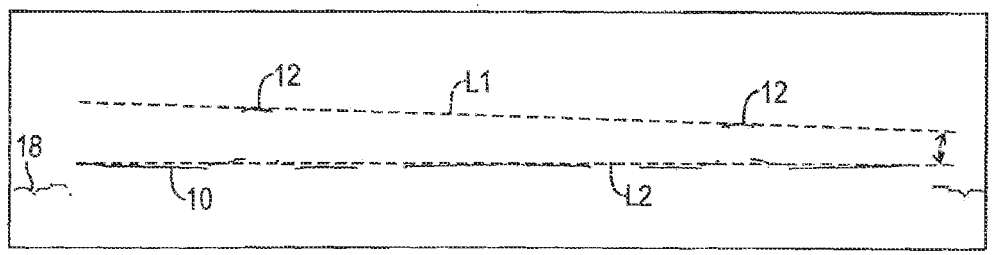
FIG. 5 illustrates an example frame of railroad track obtained with the disclosed inspection system for determining the angle of the crosstie with respect to the rail.

In another example, the angles of the crossties with respect to the rail can be determined from the image data. Referring to FIG. 5, an example frame of railroad track obtained with the disclosed inspection system is illustrated. The angular orientation of the heads of the rails 12 can be represented by a line L1. The line L1 can be estimated, for example, by best fit or curve fitting techniques known in the art. Similarly, the angular orientation of the crosstie 10 can be represented by a line L2. The line L2 can also be estimated, for example, by best fit or curve fitting techniques known in the art. These lines L1 and L2 can be averaged from several of the frames along the Z-axis near the crosstie 10. Computer analysis can then determine the angular relation between these lines L1-L2 to determine the angles of the ties with respect to rail. This condition would indicate either worn rail or a plate cut condition on a wooden crosstie.

Figure 6A:
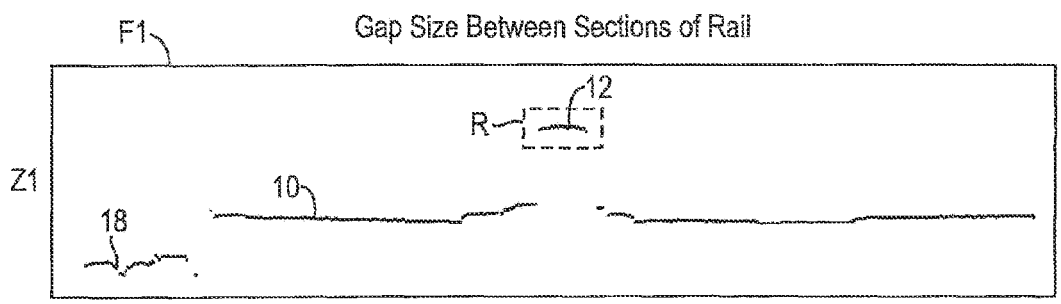
FIGS. 6A-6C illustrate example frames of railroad track obtained with the disclosed inspection system for determining a break or separation in the rail.
Figure 6B:
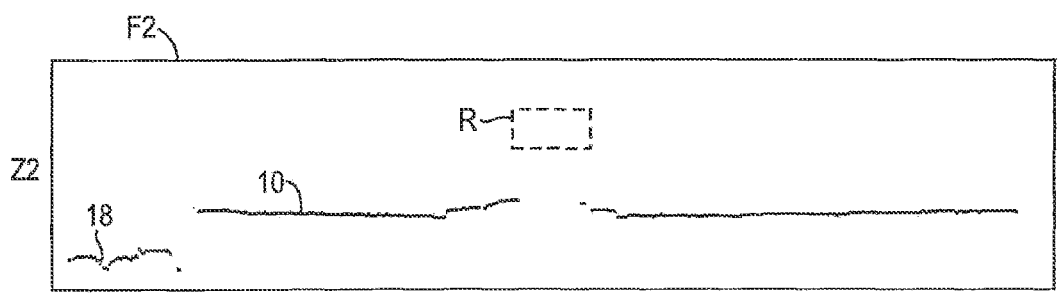
Figure 6C:
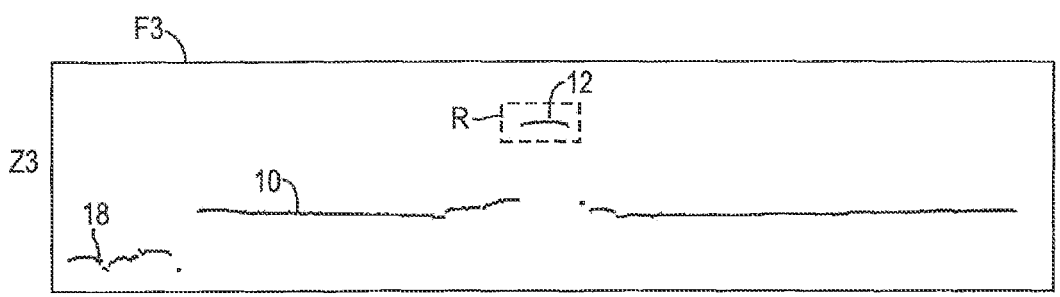

In another example, a break in the rail can be determined from the image data. Referring to FIGS. 6A-6C, example frames F1-F3 of railroad track obtained with the disclosed inspection system are illustrated that can be used to determine the separation of rail 12. FIG. 6A shows an end frame F1 having an end of a first rail 12 that is at position Z1 along the track, This end frame F1 designates the last frame showing this rail 12. FIG. 6B shows an intermediate frame F2 captured some time after the end frame F1 and at a further position Z2 along the track. This intermediate frame F2 lacks a rail because it represents a location between rails of the track. It is understood that a plurality of such intermediate frames F2 may follow the end frame F1 of FIG. 6A. FIG. 6C shows another end frame F3 having another rail 12' that is at further position Z3 along the track. Computer analysis can determine the spacing between the rails 12 and 12', for example, by first counting the number of intermediate frames F2 lacking a rail. This number of intermediate frames F2 can then be multiplied by the known spacing between frames (e.g., 0.1-inch) to calculate the distance between the rails 12 and 12'.

Determining whether a frame has a rail 12 or not can be performed by imaging techniques known in the art. For example and as shown in FIG. 6A-6C, the contour of a rail 12 is expected in a region of interest R of the frames F1-F3. Computer analysis can search the region of interest R of a frame for pixels indicating the presence of a rail contour. This can be done by averaging or summing the value of pixels in the region of interest, for example. Because the contour of the rail is composed of dark pixels, the region of interest R in a frame F1 having a rail 12 will have a greater average or sum than the region R in a frame F2 lacking a crosstie.

Figure 7A:
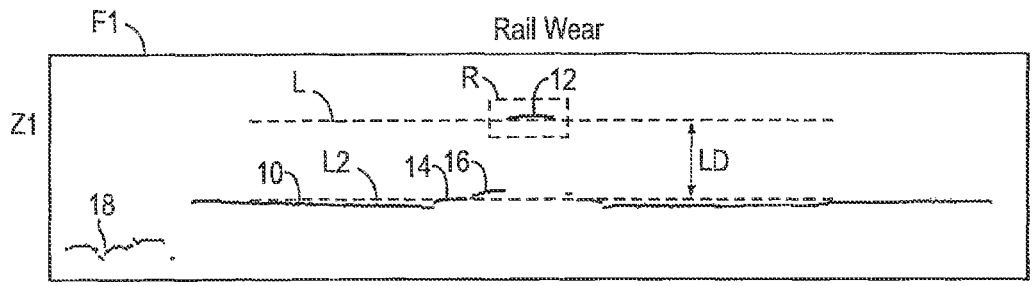
FIGS. 7A-7B illustrate example frames of railroad track obtained with the disclosed inspection system for determining wear of the rail.
Figure 7B:
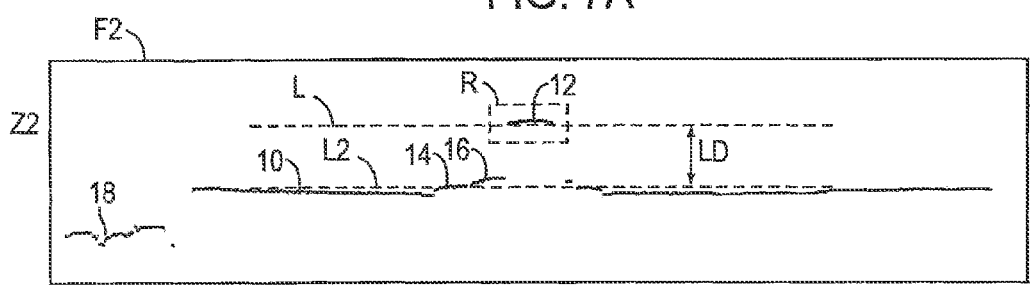

In another example, the wear of the rails can be determined from the image data. Referring to FIGS. 7A-7B, example frames F1-F2, of railroad track obtained with the disclosed inspection system, are illustrated and can be used to determine wear of the rail 12. Computer analysis can determine if a rail 12 has wear, for example, by determining whether the distance between the contour of the rail 12 and a reference point in a frame is less than the same distance in a prior frame. FIG. 7A shows a frame F1 having rail 12 that is at a position Z1 along the track. The contour of the rail 12 lies within a region of interest R and at a level L along the Y-axis of the frame F1. The contour of rail 12 is above a reference level L2, which may be the height of a tie plate, a measurable distance LD. As would be apparent to one of ordinary skill in the art having benefit of this disclosure, reference L2 may be located at a number of reference points such as tie plates 14, spikes 16, or crossties 10, for example. FIG. 7B shows another frame F2 at another position Z2 along the track. At position Z2, the distance LD is less between the contour of the rail 12 and level L2 than at position Z1. Thus, frame F2 may indicate wear of the rail 12 at the position Z2 along the track. As would be apparent to one of ordinary skill in the art having benefit of this disclosure, rail wear could also be determined comparing frames taken at different times, but at the same position along a track bed.

Figure 8:
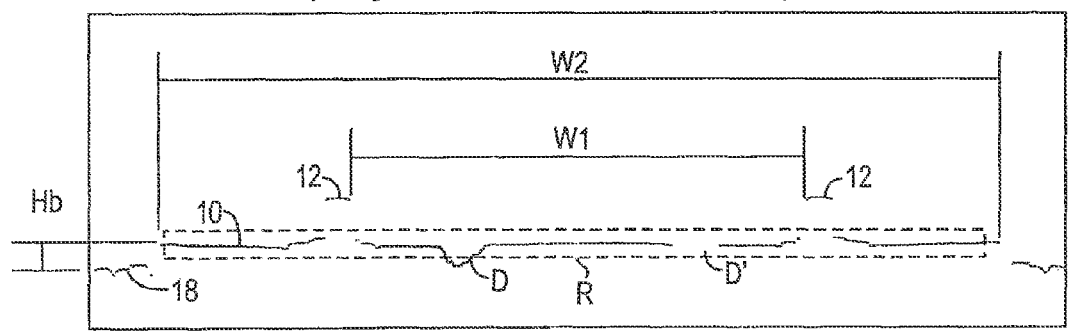
FIG. 8 illustrates an example frame of railroad track obtained with the disclosed inspection system for determining defects in the crosstie, spacing of the rail, size of the crossties, and ballast height relative to the crosstie.

In another example, the defects in the crossties 10 can be determined from the image data. As shown in FIG. 8, an example frame of railroad track obtained with the disclosed inspection system is shown. Defects D and D' are shown in the crosstie 10. Computer analysis can detect if the crosstie 10 has a defect, for example, by determining whether portions D of the contour of the cross tie lie outside a region of interest R or whether portions D' of the contour are absent within the region R. As is known, defects in a crosstie can include cracks, splits, or breaks in the ties. Using the plurality of image data near such a defect, computer analysis can determine the width and length of the defect. For example and as seen in FIGS. 11-12, the plurality of image data can be used to estimate the width W and length L of the crack shown in the edge of the crosstie. In some instances, the computer analysis can determine the depth of the defect, for example, when the orientation of the defect allows light from the laser to be projected within the defect and to be captured by the camera. In one embodiment, the angle between the laser and the camera can be relatively small so that the light projecting into a recessed defect can still be captured by the camera positioned almost parallel to the beam of laser light.

In another example, the spacing or gage of the rail or length of the crossties can be determined from the image data. In FIG. 8, an edge detecting technique known in the art can be used to find edges of the rail contours 12 in the frame, and the distance W1 between the edges can be calculated to estimate the spacing of the rails 12. Similarly, an edge detecting technique known in the art can be used to find edges of the crosstie contour 10 in the frame, and the distance W1 between the edges can be calculated to estimate the width W2 of the crosstie 10.

In another example, the height of ballast 18 relative to the crosstie 10 can be determined from the image data. In FIG. 8, a line fitting technique can determine the level of the ballast 18 and the level of the crosstie 10, and the difference between these levels can estimate the height $H_B$ of the ballast 18 relative to the crosstie 10. In another example, the scans of the railroad track can be used to determine the size of stones in the ballast 18. This can be done by analyzing a region of interest having ballast 18 and estimating sizes of the ballast stone using curvatures in the contour of the ballast 18.

Figure 9:
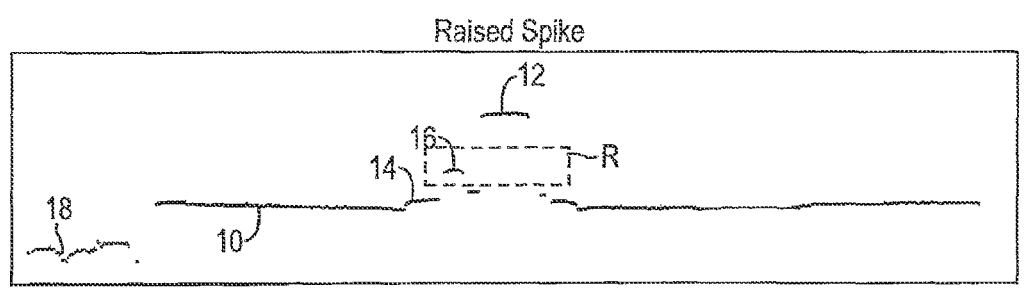
FIG. 9 illustrates an example frame of railroad track obtained with the disclosed inspection system for determining a raised spike.

In another example, raised spikes can be detected from the image data. Referring to FIG. 9, an example frame of railroad track obtained with the disclosed inspection system is illustrated. To determine whether there is a raised spike, a region of interest R can be analyzed to determine whether a portion of the contour representing a raised spike 16 occur within the region R.

Figure 10:
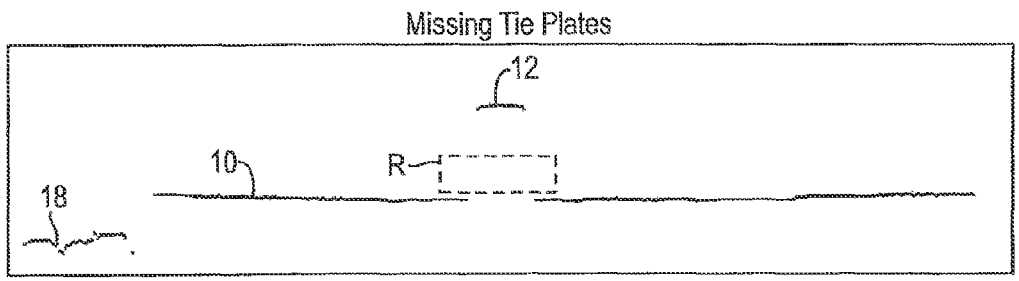
FIG. 10 illustrates an example frame of railroad track obtained with the disclosed inspection system for determining a missing tie plate.

In other examples, missing tie plates, misaligned tie plates, or sunken tie plates can be detected from the image data. Referring to FIG. 10, an example frame of railroad track obtained with the disclosed inspection system is illustrated. The missing or sunken tie plate can be detected, for example, by analyzing a region of interest R and determining whether a portion of the contour representing a tie plate occurs or does not occur within the region R. A misaligned tie plate can be determined by line fitting the portion of the contour of the tie plate and comparing the orientation of the line to that of the crosstie, for example.

In yet another alternative embodiment of this system, the surface is a railroad track bed and the processor comprises an algorithm for determining a distance between crossties of the railroad track bed, the algorithm comprising the steps of (a) analyzing a first frame, one or more intermediate frames and an end frame of the at least one image, the first and end frames comprising crossties while the one or more intermediate frames lack crossties; (b) determining a number of the one or more intermediate frames lacking crossties; (c) determining a known spacing between frames; and (d) determining the distance between the crossties of the first and end frames based upon the number of the one or more intermediate frames lacking crossties and the known spacing between the frames In an alternative embodiment of this system, the surface is a railroad track bed and the processor comprises an algorithm for detecting a misaligned or sunken tie plate of the railroad track bed, the algorithm comprising the steps of: (a) analyzing a frame of the at least one image, the frame comprising a region of interest; (b) determining whether the region of interest contains a tie plate; (c) if a tie plate is present, determining a crosstie contour and a tie plate contour; (d) comparing an orientation of the crosstie contour and an orientation of the tie plate contour; and (e) determining whether the tie plate is misaligned or sunken based upon the comparison.

In yet another alternative embodiment of this system, the surface is a railroad track bed and the processor comprises an algorithm for identifying a break in a rail of the railroad track bed, the algorithm comprising the steps of: (a) analyzing a first frame, one or more intermediate frames and an end frame of the at least one image, the first and end frames comprising rails while the one or more intermediate frames lack rails; (b) determining a number of the one or more intermediate frames lacking rails; (c) determining a known spacing between frames; and (d) identifying the break in the rail based upon the number of the one or more intermediate frames lacking rails and the known spacing between the frames. In yet another embodiment, the surface comprises one or more of a road, plant, building foundation, automobile bridge or sidewalk.

An exemplary method of the present invention comprises the steps of: (a) illuminating a light across the span of the surface, the light totaling a combined intensity of at least 0.15 watts of intensity per inch of a width of the light; (b) receiving at least a portion of the light reflected from the surface using one or more cameras, the one or more cameras comprising a bandpass filter adapted to pass only a band of the reflected light, the band corresponding to a dip in solar radiation; (c) generating at least one image representative of a profile of at least a portion of the surface; (d) analyzing the at least one image; (e) determining one or more physical characteristics of the portion of the surface; and (f) outputting the determined physical characteristics of the portion of the surface. In yet another exemplary method, step (a) comprises the step of projecting a plurality of beams of light to form the light illuminated across the surface, the plurality of beams of light each having an angular spread of 45 degrees.

In an alternative method, the plurality of beams of light comprise a center beam and two outer beams on opposite sides of the center beam, step (a) further comprising the step of projecting the two outer beams outwardly from the center beam at a 10 degree angle. In another method, the light illuminated across the span of the surface is created using 808 nm lasers.

In yet another exemplary method, the surface may be a railroad track bed, the method further comprising the step of determining a distance between crossties of the railroad track bed, the step of determining the distance comprising the steps of: (a) analyzing a first frame, one or more intermediate frames and an end frame of the at least one image, the first and end frames comprising crossties while the one or more intermediate frames lack crossties; (b) determining a number of the one or more intermediate frames lacking crossties; (c) determining a known spacing between frames; and (d) determining the distance between the crossties of the first and end frames based upon the number of the one or more intermediate frames lacking crossties and the known spacing between the frames.

In yet another method, the surface is a railroad track bed, the method further comprises the step of identifying a break in a rail of the railroad track bed, the step of identifying comprising the steps of: (a) analyzing a first frame, one or more intermediate frames and an end frame of the at least one image, the first and end frames comprising rails while the one or more intermediate frames lack rails; (b) determining a number of the one or more intermediate frames lacking rails; (c) determining a known spacing between frames; and (d) identifying the break in the rail based upon the number of the one or more intermediate frames lacking rails and the known spacing between the frames.

In this exemplary method, the surface may be a railroad track bed, the method further comprising the step of detecting a misaligned or sunken tie plate of the railroad track bed, the step of detecting comprising the steps of: (a) analyzing a frame of the at least one image, the frame comprising a region of interest; (b) determining whether the region of interest contains a tie plate; (c) if a tie plate is present, determining a crosstie contour and a tie plate contour; (d) comparing an orientation of the crosstie contour and an orientation of the tie plate contour; and (e) determining whether the tie plate is misaligned or sunken based upon the comparison.

Yet another alternate method of the present invention comprises the steps of: (a) projecting a light onto the surface, the light having an intensity of at least 0.15 watts of intensity per inch of a width of the light; (b) receiving at least a portion of the light reflected from the surface into a receiver; (c) utilizing a bandpass filter of the receiver to pass a band of the reflected light which corresponds to a dip in solar radiation, wherein the reflected light is adapted to be more intense than the solar radiation at the dip; (d) utilizing the passed band of the reflected light to generate one or more images representative of a profile of at least a portion of the surface; (e) determining one or more characteristics of the portion of the surface; and (f) outputting the determined characteristics of the portion of the surface. In an alternative method, step (a) further comprises the step of projecting a plurality of beams of light to form the light projected onto the surface, the plurality of beams of light each having an angular spread of 45 degrees. In yet another exemplary method, the plurality of beams of light comprise a center beam and two outer beams on opposite sides of the center beam, step (a) further comprising the step of projecting the two outer beams outwardly from the center beam at a 10 degree angle.

In the alternative, the surface may be a railroad track bed, the method further comprising the step of determining a distance between crossties of the railroad track bed, the step of determining the distance comprising the steps of: (a) analyzing a first frame, one or more intermediate frames and an end frame of the one or more images, the first and end frames comprising crossties while the one or more intermediate frames lack crossties; (b) determining a number of the one or more intermediate frames lacking crossties; (c) determining a known spacing between frames; and (d) determining the distance between the crossties of the first and end frames based upon the number of the one or more intermediate frames lacking crossties and the known spacing between the frames.

In yet another alternative method, the surface may be a railroad track bed, the method further comprising the step of identifying a break in a rail of the railroad track bed, the step of identifying comprising the steps of: (a) analyzing a first frame, one or more intermediate frames and an end frame of the one or more images, the first and end frames comprising rails while the one or more intermediate frames lack rails; (b) determining a number of the one or more intermediate frames lacking rails; (c) determining a known spacing between frames; and (d) identifying the break in the rail based upon the number of the one or more intermediate frames lacking rails and the known spacing between the frames.

In yet another alternative method, the surface may be a railroad track bed, the method further comprising the step of detecting a misaligned or sunken tie plate of the railroad track bed, the step of detecting comprising the steps of: (a) analyzing a frame of one or more images, the frame comprising a region of interest; (b) determining whether the region of interest contains a tie plate; (c) if a tie plate is present, determining a crosstie contour and a tie plate contour; (d) comparing an orientation of the crosstie contour and an orientation of the tie plate contour; and (e) determining whether the tie plate is misaligned or sunken based upon the comparison.

Advantageously, an embodiment of the laser/camera line optical scanning and analysis system disclosed above has been developed and programmed to identify wood crosstie physical attributes to find discrete crossties for the purpose of condition assessment. The system can then use the condition data to "grade" ties and can create a tie replacement plan, such as one that is GPS- and/or milepost-based. Specifically, a method has been developed for analyzing a numerical scan of railroad ties, to automatically identify tie defects and grade the ties.

To grade ties, the tie areas to grade are detected. Machine vision algorithms are used to spatially locate ties, ballast covered regions, tie plates, spikes, jointed and welded rail, adz tie location and broken ties. The system can also distinguish between roll-formed tie plates and typical spike plates to accurately measure plate cut.

Figure 13:
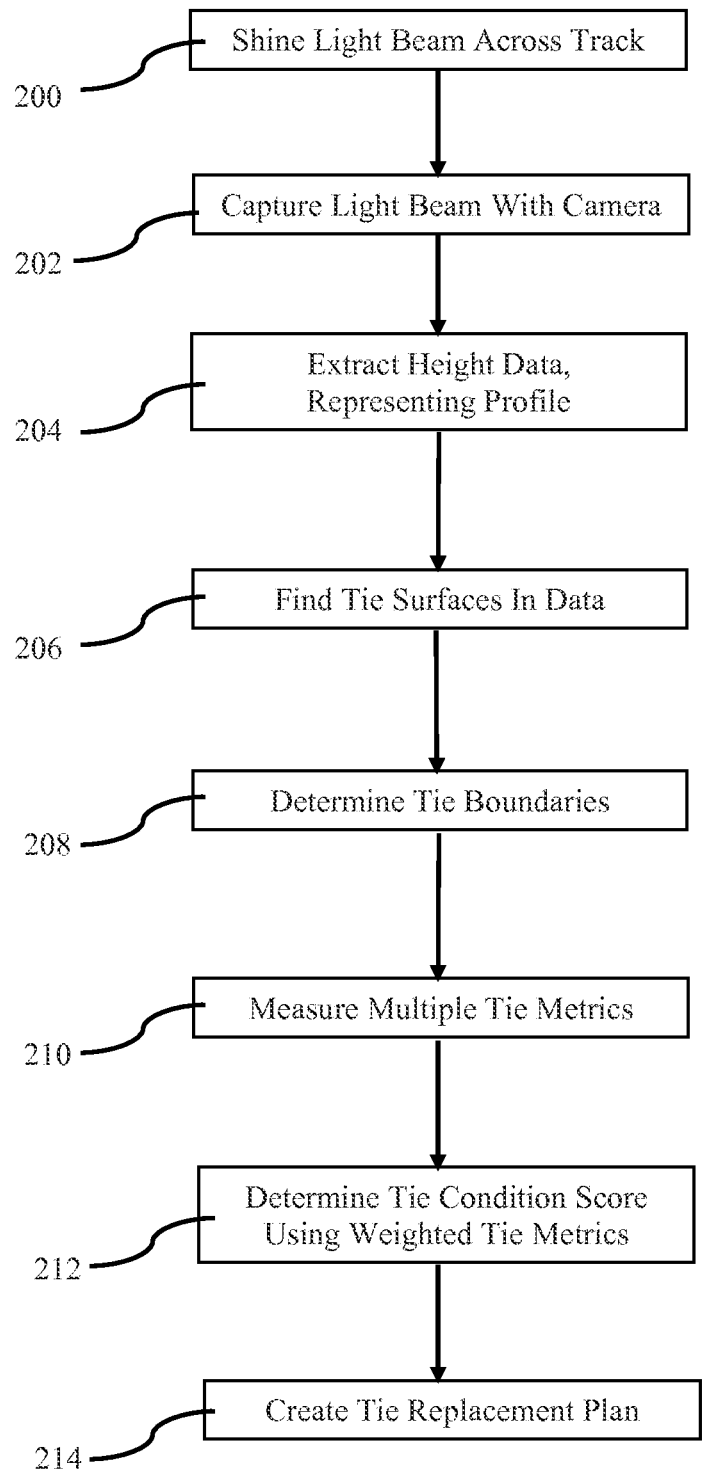
FIG. 13 is a flowchart outlining one method of identifying and producing condition scores for railroad ties.

The general steps in an embodiment of this process are outlined in FIG. 13. The first step involves scanning a set of railroad ties with an optical scanning system to create a first scan set. This step can involve scanning the railroad ties with a 3-D optical scanning system that captures 3-D images of the track, and generating a computer-readable image representative of a profile of the railroad ties. As discussed above, this scanning step can involve projecting a beam of light across a railroad track bed (block 200) that includes the railroad ties and receiving light reflected from the railroad ties with a camera or other optical receiver (block 202). The camera produces a camera signal, and a computer-readable image is then generated from the camera signal. This computer-readable image provides a profile of the railroad track bed from which height data can be extracted regarding objects in the image (block 204). The result of this step is a scan set of data representing condition information regarding the ties in the set. In one embodiment the scan set represents a numerical topographic map or profile of the track bed, and therefore, a numerical topographic map of each tie in the sample set.

Next, machine vision algorithms are applied to analyze these images to find tie surfaces (block 206), determine the boundaries of individual railroad ties (block 208), and locate tie features to compute or determine a variety of metrics related to their condition (block 210). Based on these condition metrics, a grade or score can be computed for each tie by using weighted values of the tie metrics (block 212). The tie condition scores can then be used to create a tie replacement plan for the particular section of railroad track.

A variety of machine-vision processes can be used for finding ties, and this can be done in various ways. One method for finding tie boundaries is outlined in the flowchart of FIG. 14. Another method for finding railroad tie boundaries using an expected tie-to-tie distance is outlined in FIG. 15. Generally, the machine vision algorithms use various techniques that are dependent on the feature to be located. For example, ties are relatively smooth, whereas the ballast between ties is relatively rough. Using various filtering methods, the boundary of the tie can be accurately identified. Ballast on a tie is identified using similar mechanisms with different filtering methods applied to distinguish the difference between a "rough" tie and ballast.

Figure 14:
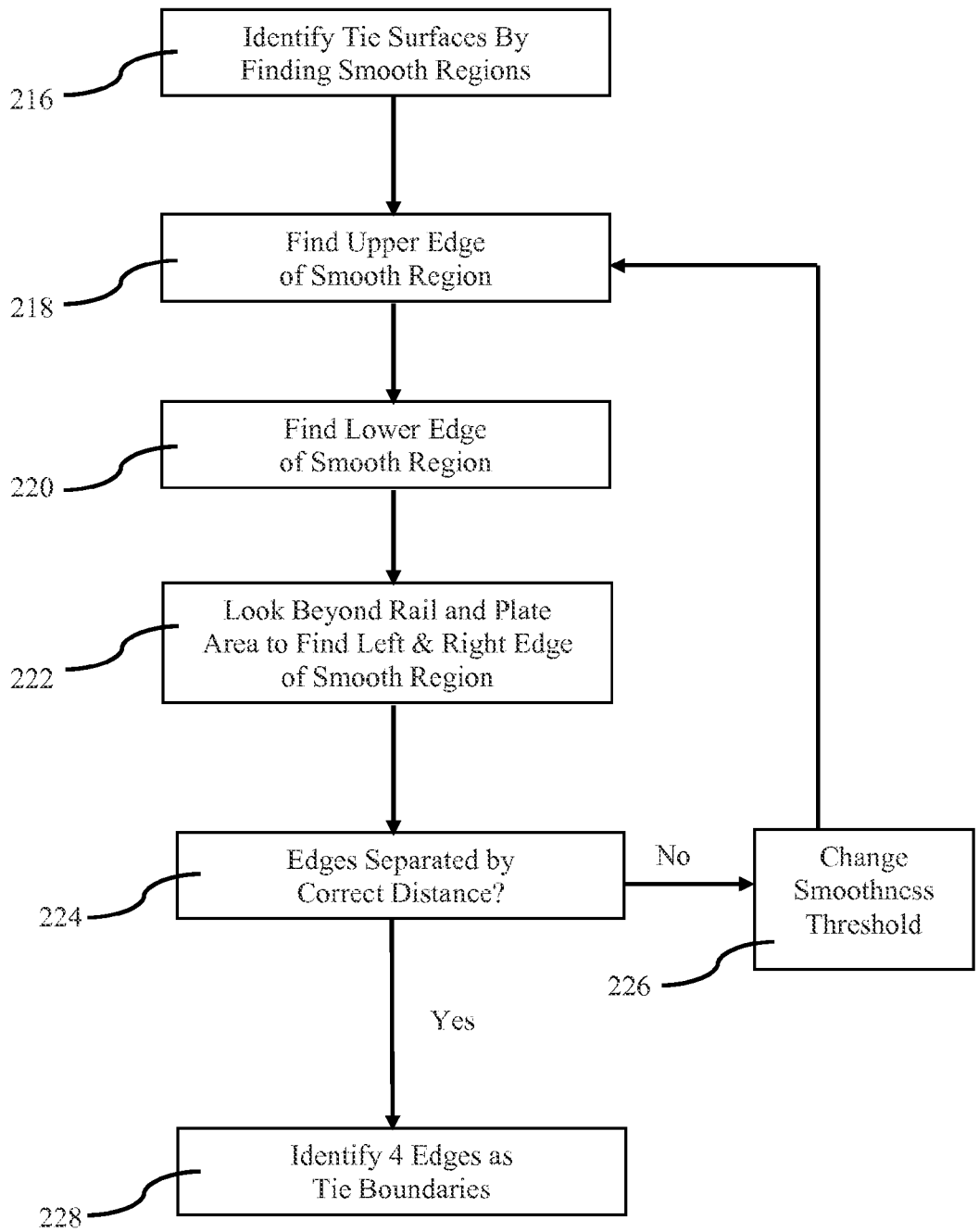
FIG. 14 is a flowchart outlining one method of finding tie boundaries.

Referring to FIG. 14, in one embodiment the processor applies a machine vision algorithm that first identifies regions of the image data that are smooth relative to surrounding regions (block 216). This can be done relative to a smoothness threshold, which can be a data value that represents the standard deviation of a portion or portions of a single profile. If a portion of a single profile has a very low standard deviation in the height of the pixel data, then that portion of the profile can be considered smooth and is likely part of a tie. Once a smooth region is identified, a first or upper edge of that smooth region is found that is oriented approximately perpendicular to the travel direction of the optical scanning system (block 218).

After finding the first edge, the system then finds one or more additional edges of the smooth region that are also oriented approximately perpendicular to the travel direction. The system then analyzes each of the one or more additional edges to find one that is spaced from the first edge by approximately a width of a tie. This edge is identified as the second or lower edge of the tie (block 220). The first and second or upper and lower edges of the tie represent the forward and rearward vertical edges or surfaces of the railroad tie, relative to the direction of travel of the optical scanning system. Another approach that can be used is to find the two strongest edges near where the data transitions from a rough region to a smooth region and from a smooth region to a rough region.

Once the forward and rearward edges of the railroad tie are identified, the system can then look beyond the rail and plate area to find third and fourth edges of the smooth region that are approximately perpendicular to and adjacent to the first edges, and located outside of the rail, tie plate and/or fastener region, on opposing sides of the track (block 222). These third and fourth edges are the outside ends of the railroad tie, generally representing end surfaces of the tie that are substantially parallel to the direction of travel of the optical scanning system. This step involves first identifying regions of the image that include rails, tie plates and/or fasteners. Known tie plate features such as nominal range of widths, slope, spikes and/or spike holes, and rolled plate patterns can be used to locate tie plates. Pattern matching algorithms can be used to identify spikes and joint bars.

Alternatively, the system can identify the first and second edges of the tie as the boundaries of the railroad tie. This approach can be used, for example, if it is desired to only inspect predetermined regions of the ties. In this configuration, the field of view of the system is "zoomed in" or pre-set to a desired region of the ties to be inspected, rather than taking in the full width of the ties. For example, the field of view can be narrowed such that the outer ends of the railroad ties are outside the field of vision. Alternatively, the system can be programmed to simply ignore any regions of the tie which do not fall within the pre-determined region of the tie to be inspected, even if the scan data takes in a larger area. For example, the system can be configured to see or consider only an area including the ties outside of and/or between the tie plates. This can be done because the location of the optical scanning system is arranged relative to the tops of the rails. Thus, for example, an 8 foot long tie always ends approximately 39" outside of the gage side of the rail and a 9 foot long tie always ends approximately 45" outside of the gage side of the rail. The system could be made to only inspect a portion of the image from 38" from the left gage side to 38" from the right gage side.

Where the field of view is narrowed in some way, as described above, the system can be configured to omit the identification of the 3rd and 4th edges of the tie because those edges would be outside of the region to be inspected. In such cases, the third and fourth edges of the tie can be presumed to be the edges of the field of view of the optical scanning system. In this way the system is only able to capture data where a tie surface occurs, when a tie is present. This approach is considered acceptable because the last few inches at each end of the ties (portions outside the rails) are not as significant to proper functioning of the tie. A similar method can be followed to ensure that a rail or tie plate is not considered as a portion of the tie surface, because these elements are located at approximately the same place relative to the gage side of the rail, which sets the location of travel of the system.

Before determining that the first through fourth edges actually represent the edges of the tie, the system can be configured to evaluate the distance between these edges, to determine whether they are separated by the correct distance (block 224). Widths of railroad ties fall within a relatively narrow range, and while tie lengths are somewhat more variable, these still fall within a known range. If the distances between the first and second edges are not within the expected ranges, the system can adjust the smoothness threshold (block 226) and return to block 218 to again look for the tie boundaries. If the distances between the first and second edges are within the expected ranges, the system can identify the first through fourth edges as the boundaries of the railroad tie (block 228).

In the process of finding the boundaries of a given railroad tie, the system can also be configured to identify a smooth region inside the tie boundaries as a tie surface area, or the top surface of the tie. Further, regions that do not satisfy the smoothness threshold, or a second smoothness threshold, and/or areas physically above the smooth region can be identified as non-tie surfaces. For example, regions of the image that include rails, tie plates and/or fasteners represent non-tie surfaces, and can be filtered out and not considered when determining the condition of the railroad tie, as discussed below.

The tie surface area can be normalized by the quantity of non-tie surface area within the tie boundaries. For example, if 40% of the tie surface is covered, then this 40% will not be visible for examination. In this case the remaining 60% can be examined. However, if it is assumed that the covered 40% is similar to the uncovered 60%, the system can normalize the number or area of defects found within the uncovered 60%. Such non-tie surface area can represent ballast lying atop the tie, vegetation growth, or other conditions. Identifying ballast coverage can be done by splitting the tie into several zones and calculating the percentage of the tie that is not smooth (i.e. covered by ballast). The algorithm then adjusts to consider only the visible portion of the tie, and also evaluates whether enough of the tie is visible to measure tie metrics. Ties having a quantity of non-tie surface area that is above some selected threshold can be identified as ties that cannot be graded or scored. This can represent ties that are buried under a significant quantity of ballast, for example, thus hiding a significant portion of the tie from view and preventing an accurate condition determination.

Figure 15:
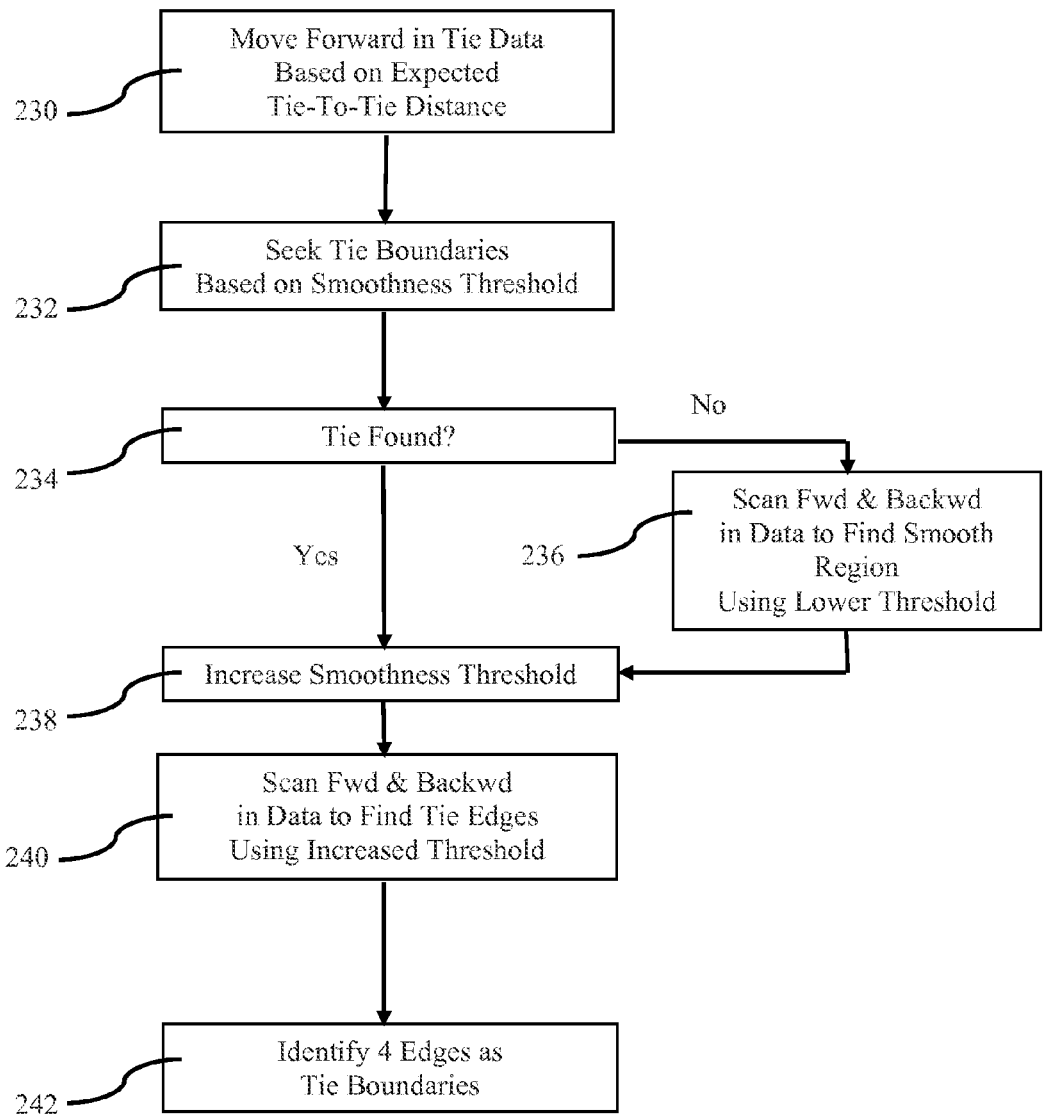
FIG. 15 is a flowchart outlining a method for finding ties boundaries using an expected tie-to-tie distance.

Once a given tie has been located and identified as discussed above, the system can look for the next tie, following a process outlined in FIG. 15. In this process the system first moves ahead to a new portion of the image data to a next expected tie location, based upon an expected tie-to-tie distance (block 230). The system then searches the new portion of the image data to identify a new smooth region based upon the smoothness threshold, in the manner discussed above and outlined in FIG. 14 (block 232). To augment this process, the system can be programmed to search forward and backward in the new portion of the image data (relative to the next expected tie location) to identify the new smooth region using the original smoothness threshold (block 236). When this approach is used, the algorithm can scan forward and backward from the expected location for the next tie. In an alternative approach, instead of jumping ahead in the file the expected tie-to-tie distance, the system can examine every succeeding image profile (or every x succeeding image profiles) to determine if it contains a smooth tie surface, and filter out smooth surfaces which are too narrow to be a tie.

In this process, if a new smooth region is not immediately found, the system can adjust (i.e. increase or decrease) the smoothness threshold (block 238) with increased distance from the next expected tie location. The adjustment can be an increase or decrease because with some metrics a smoother surface may have a lower measurement, while with other tie metrics smoother surfaces may have a higher measurement. If a smooth region is not found at first the system can adjust the smoothness threshold to look for surfaces that are not quite as smooth (block 240). In this way, the system can intelligently search for the next tie if it is not immediately found, until it identifies the four edges of the next tie (block 242). If no new smooth region is found within some reasonable proximity to the expected location of the next tie, the processor can be configured to determine that a tie is missing or covered. In one embodiment, the reasonable proximity of the next expected tie location can be about two times the expected tie-to-tie distance.

Tie Heuristics can be used to locate ties in areas where the machine vision algorithms failed to find ties correctly, such as where the tie spacing is smaller or larger than expected, where tie widths are smaller or larger than expected, where tie lengths are smaller or larger than expected, and where large areas of ballast coverage are in the track field. In these sorts of anomalous regions, the system can perform a second pass, processing the image data again using different machine vision algorithms and/or different value thresholds that more accurately detect these ties. It is believed that tie heuristics are more likely to be used with the tie finding approach mentioned above, where every profile is examined and the smoothness threshold does not changed based on how close the profile is to the expected location of the next tie. However, tie heuristics can also be used for the primary approach for making sure that missing ties or phantom ties are identified, or for determining the number of covered ties in areas where there are large areas covered in ballast or excessive vegetation growth.

The processor can be configured to determine a tie-to-tie distance between each tie and a next adjacent tie, and use this information to identify ties that may have been missed initially, and to determine a variety of other metrics. For example, the system can compare the measured tie-to-tie distance to an expected (i.e. design) tie-to-tie distance. If the tie-to-tie distance is too large (i.e. greater than the expected tie-to-tie distance by more than some predetermined amount), the system can determine that a tie is missing or covered. If the tie-to-tie distance is too small, the system can determine that a "phantom" tie has been identified.

When missing or phantom ties are identified, the system can be programmed to reanalyze the image data to determine if there has been an error. For example, if a missed tie is indicated, the system can be programmed to adjust the smoothness threshold and reanalyze the area(s) in which the tie-to-tie distance was determined to be too large, as shown at block 226 in FIG. 14. In this analysis, the system can be programmed to find new edges of smooth areas based upon the adjusted smoothness threshold. These new edges can be identified to indicate the edges of a tie that was missed. On the other hand, where a phantom tie has been identified, the system can be programmed to compare adjacent areas in which the tie-to-tie distance was determined to be too small and compare the smoothness of these areas to determine which areas do not actually represent a tie. The system can also determine if one tie with a very wide split was actually identified as two narrow ties which were very near each other.

Once the railroad ties are located, the system can then use a variety of algorithms to determine various condition metrics of the ties, as indicated at block 210 in FIG. 13. These condition metrics can then be used to determine a grade or score of the tie. The condition metrics that are used can include a variety of factors that relate to the function and longevity of railroad ties, and can be determined using various texture analysis techniques to infer information about the surface structure of the tie. These metrics can include tie warpage (i.e. a measure of the "bow" across the length of the tie, and possibly including the direction of this bow), tie height and tie surface roughness, which indicates that a tie may be splintering. A variety of computational factors can be used in computing surface roughness. First, the standard deviation of the tie height can be computed, as well as the standard deviation of the tie height ignoring areas of the tie covered in ballast. Then the standard deviation of the tie height with compensation for tie warpage can be computed, ignoring areas of the tie covered in ballast. Roughness can be a scaled value derived from the tie surface standard deviation with ballast removed and the warpage removed from the tie.

The tie metrics can also include a specific indicator of a broken tie condition. Broken ties can be located by using tie heuristics or detecting discontinuities between surfaces of the tie, or can be determined when no tie surface can be found in a given region of the tie, but the surface that is there is not above the identified surfaces of the tie. This is likely, for example, if the end of a tie, beyond the rail, has broken off and is missing. The difference between a tie region being broken and being covered in ballast is that regions that are covered in ballast are higher than the uncovered region. However, it is also possible that a broken tie could be covered by ballast, and the system disclosed herein can have difficulty identifying a broken tie in this situation.

Advantageously, the method disclosed herein can use tie heuristics, such as average tie spacing and tie width, to identify missing ties, and find obstructed ties in crossings and mud spots. Mud spots are short sections of track which do not drain properly and where mud fouls the ballast when it rains. When it is dry the mud dries as dirt in the space between the ballast rocks. The result is that the area between the ties becomes smooth, much like a tie. In these areas tie heuristics can be used to determine that a second pass should be made to find the correct boundaries of a tie. Similarly, at a road crossing the ties are not visible because they are covered by the road surface. At road crossings, tie heuristics can be used to determine the number and location of ties that are under the road crossing. Tie heuristics can also be used to keep proper count of the number of ties in a specific length of track, so that tie counts per mile are accurate. The system discerns and locates ties in mud, and adjusts grading according for the associated degradation.

Geometric characteristics of the tie can also be included in the condition metrics, including physical dimension and orientation metrics. These metrics can include tie length, tie width, and tie skew angle (angle relative to the rails). These geometric characteristics are desirable because shorter or narrower ties do not distribute loads as well. Ties that are at a skew angle do not accept tie plates or other track materials properly.

The tie metrics can also include information related to tie plates and spikes, including tie plate cut (i.e. a measurement of the depth that a tie plate has worn, pressed or cut into a tie's surface), differential plate (the difference between the gage side plate cut measurement and the field side plat cut measurement on a single tie plate), and spike height relative to some reference point, such as the rail bottom or tie plate surface, or the surface of the tie. As noted above, tie plate features such as nominal range of widths, slope, spikes and/or spike holes, and rolled plate patterns are used to locate tie plates. Pattern matching algorithms are used to identify spikes and joint bars. Once these features have been found, the system calculates plate cut by finding the edges of tie plates and the surface of the tie, and uses this information to contribute to the tie condition assessment and grading.

The first step in detecting condition aspects related to tie plates is to find the tie plates in the image data. Known tie plate features such as nominal range of widths, slope, spikes and/or spike holes, and rolled plate patterns are used to locate tie plates. Tie plates can be found by first analyzing the image data to find objects that are of tie plate size and are in the suspected general location where a plate should be. The next step is to eliminate known non-plate objects (e.g. ties, rails) based on position and size properties.

Following this step, a strict edge-finding subroutine is performed to enhance the outside edges of the plate and thus separate the plate from the tie. In analyzing an image, this process can start by selecting a pixel that is believed to be a plate pixel in a plate blob. The system then works its way along the boundary of the blob by determining if the pixels are "connected" in a straight line, which then implies the presence of an edge.

Once the tie plate has been identified, the system can measure the depth that a tie plate has worn, pressed or cut into the tie's surface. In this process, the computer analysis finds at least one region inside the plate edge at which to measure the plate height, and at least one measurement on the tie surface, outside of the plate edge, to measure the tie height. The difference in elevation of the tie plate edge and the tie surface, relative to the known thickness of the tie plate, is the plate cut measurement.

In one embodiment, the height of the plate and the tie can be measured in four zones on each rail, the top and bottom half of the tie for the gage and field sides of the rail. There can thus be eight plate cut measurements per tie, which can be designated as plate cut 1 to 8. The maximum plate cut is the largest value of the eight measurements. Differential plate cut measurements can also be computed on each rail as the difference between plate cut measurements on opposing sides of a given rail. In one embodiment, this results in twelve differential plate cut measurements. The maximum differential plate cut can be the maximum difference between plate cut measurements on each side of the rail.

The tie plate identification process can also be modified to find or distinguish between conventional tie plates and roll-formed tie plates or tie plates which utilize elastic-fasteners, such as those sold by Pandrol USA, LP, of Bridgeport, N.J. A first step in this process is to determine the "horizontal slope" of the tie plate by determining whether and to what extent the top surface of the tie is out-of-level on either side of the rail in a direction perpendicular to the rail. This can be done by determining the first and second derivatives of the heights of the tie plate blobs in a direction perpendicular the rail. If the second derivative of the slope is negative, this indicates that the tie plate has an inverted U shape, which indicates a roll-formed tie plate. If the slope has a negative first derivative (i.e. a downward slope that is constant) this indicates a spike type plate.

If a roll-formed tie plate is identified, the system can then search vertically across the inverted U shape of the tie plate to make sure it extends the entire known width of a tie plate. In one embodiment this is approximately equal to the width of a tie and is inside the found edges of the tie. Other objects that may have a similar shape, such as large rocks, are filtered out. This helps to ensure that the identification of the plate was not a false signal such as a rock or spike. At this point, the tie plate edge-finding routine outlined above can be performed. Where a roll-formed tie plate was identified, the tie plate edge-finding routine is modified by beginning the edge search on the outside of the clip mount (i.e. the inverted U shape).

Pattern matching algorithms can also be used to identify spikes. The height of each spike relative to the rail's bottom flange or tie plate surface can be computed from the image data by measuring the difference in the height pixels, subtracting the expected height of each spike and multiplying by the number of height pixels per unit of measurement. Raised spikes are indicators of a tie that is not functioning properly. On the other hand, spikes lying completely flat against the rail bottom, with the presence of "worn spots" on the rail base, can be a sign of a hollow tie or one where the spike and the tie have little holding capacity.

The tie metrics can also include information related to depth of adzing. Adzing is a maintenance practice to add life to a tie that has some plate cut, by resurfacing the top surface of the tie only in the area of the tie plate, by removing the portion of tie that is plate cut. The result is a smooth clean surface for the tie plate to sit on, but which is slightly lower than the remaining surface of the tie. After adzing, the elevation of the tie is raised, so that the new, adzed surface is the substantially the same height as the surfaces of the non-adzed ties, and ballast is forced under the tie, so that the adzed tie remains at the higher elevation. Since adzing of a tie can affect its life and its strength, the system and method disclosed herein seeks to identify and measure that factor.

The machine vision algorithms used in this method allow this system to identify tie adzing and measure its depth or magnitude. Adzed tie locations are located by identifying characteristic discontinuities in the surface of the tie, by identifying a flat tie surface beyond the edge of the tie plate that is lower than the remaining surface of the tie. This measurement can be performed in multiple zones, such as four zones for each tie, such as the regions just beyond the each side of the tie plate. The system can also identify ties with adzing by looking for height differential of the surface of the tie in these same zones, and adjusting the tie condition assessment for magnitude of adzing detected. Once adzing has been identified and measured, a "max adz" value can be computed as the maximum of the adz measurement in each zone.

The system can also identify and report ties with creosote puddled or emerging onto the tie surface. As is well known, creosote is often used as a preservative for wood railroad ties. Very new ties often have excessive creosote on their surface, which can cause a void of data on the tie using the optical inspection system disclosed herein. Advantageously, the system can identify and report ties with creosote puddled or emerging onto their surface by detecting the pattern of void data, which is typical of ties with puddled or emerging creosote. The grading model can then be adjusted based on this attribute.

Once the various tie condition metrics have been determined, the system can be configured to generate or compute a condition grade or score for each tie. This can be done by applying a weight factor to each of the condition metrics or selected condition metrics, and then computing the condition score based on a sum or other mathematical combination of the weighted condition metrics. In one embodiment, the tie score $S_T$ can be represented by the following equation:

$$S_T = \Sigma(w_n * M_n) \quad (1)$$

where $w_n$ represents the unique weight factor that is applied to each variable, and $M_n$ represents each tie metric that is used. The score produced by equation (1) represents a condition of the respective ties. It is to be appreciated that other mathematical scoring methods and formulas can also be used.

The tie grade can be determined by placing the tie score into ranges. In one embodiment, the tie grades include four levels of tie condition that are comparable to tie condition grades that would be recorded by a track inspector. For example, the grade scores can be numbers, such as 1, 2, 3 and 4, to characterize a tie as good (1), marginal (2), bad (3), or failed (4). It is to be appreciated that this grading scale is somewhat arbitrary. Any other suitable tie grading scale can also be used, and intermediate numeral grades (e.g. 2.6, 1.5) can also be used with the number scale described here.

The system can also be configured to determine GPS and heading information of a position of the railroad tie along the railroad track bed, and adjust the condition grade of the tie based upon a degree of track curvature in that location, or simply by fact that location is in a curve and not tangent track. This is desirable since ties can experience different rates of wear depending on degree of curvature in curved sections. The system can also be configured to locate a rail joint and/or weld near the tie and adjust the condition grade of the tie to account for higher degradation rates near the rail joint and/or weld.

The system can also generate or adjust tie grades based on tonnage (i.e. the known average tonnage of traffic that travels the specific section of track in which the tie is located), speed (i.e. the posted maximum speed for the section of track) and decay zone. Decay zone can be a factor that indicates the amount of rain and/or humidity in a region where the tie is located. Ties in areas with common or high rainfall or high humidity will tend to degrade at a higher rate. For example, regions having high humidity and rainfall, such as swampy regions, can be considered very high decay zones, while desert areas are generally considered very low decay zones.

Curvature, tonnage, speed and other such factors can relate to information input by a user or available from a table or other database. GPS or milepost locations can be associated with the scanning process, and can be tied to data files that indicate the rail curvature, tonnage, speed, and the presence of decay zones. Curvature of the track can also be determined by obtaining GPS and heading information of a position of a given railroad tie. Upon analysis of these metrics, the system processor can compute or recompute a score or grade for each tie in the set of railroad ties in the manner discussed above.

Advantageously, the location of each railroad tie in the set of railroad ties can be determined with respect to the railroad track bed, and the tie locations can be correlated with GPS and/or milepost location data or distance to other landmarks, if desired. The tie condition grades can then be used to create a tie replacement plan (block 214, FIG. 13). In one embodiment, the tie condition grade, tie location, and spacing between ties having a tie condition grade above a selected grade threshold, can be correlated to create the tie replacement plan. This tie replacement plan can be GPS- or milepost-based, or it can be based upon known landmarks and distance or tie count, or other methods.

The system can also identify an open deck bridge by identifying ties that are spaced closer together than normal, and where most of the space between the ties is empty (i.e. no ballast or fill). The result from scanning this sort of region is large areas of no height data between more closely-spaced ties. In the system described herein, this comes in as missing data outside of the rails and between the ties. If the space below the top surface of the ties, above the bottom surface of the ties and between the ties is void of aggregate, then the ties are identified as open deck bridge ties. These would typically also be spaced closer together. In one embodiment, an algorithm for identifying bridge ties identifies sections of track in which there are voids or shadows in the data, corresponding in shape and size to the spaces between ties. The system then coalesces geographically-collocated (i.e. contiguous) sections or stretches of such ties into a single bridge entity defined by the locations of the first and last such ties.

Tie heuristic standards can be different on open deck bridges because open deck bridge ties can be graded by a different set of criteria than standard ties. The loads experienced by open deck bridge ties differ from those on ballasted track: tie spacing on these bridges is normally much smaller so that loads are distributed to more ties. Bridge ties are also fixed to bridge girders and do not benefit from the load attenuating properties of ballasted track. Due to the difference in life-cycle of these ties, and the need for a specialized gang to remove/replace bridge ties, they benefit from an individualized condition assessment unique to open deck bridges.

The system can identify other specific items, such as specific fastener types, the start and end of crossings, switches and switch points, switch ties, switch frogs, and joint bars. For example, the system can detect concrete fasteners by detecting rail bottom height, rail top edge, rail bottom edge, and relative height differences between all these points to determine where a fastener starts. Once the location where the fastener starts is found, the resulting fastener can be computationally "built" from known height measurements. The system can also detect concrete fastener insulators by determining a height difference between the nearby rail bottom height and the height surrounding the found fastener. The system can also detect concrete e-clip fasteners by locating the highest point on the clip and looking for immediate drops or shadows in the surrounding area.

The system can also detect switches by detecting the presence of more than two rails in a horizontal direction, or perpendicular to the rail. The system can detect grade crossings by detecting a section, area, or track that is almost entirely the same height, or close to same height, as the rail top. The system can also detect joint bars by finding the rail top edges as strict "rail top only" edges, and then a second set of rail top edges that include edges "just below rail top." The two edge outlines are compared for a shape that resembles a joint bar and/or joint bar bolts.

The system can also detect Safelok1- and Safelok3-type fasteners. These are another variety of clip-type fasteners sold by Pandrol USA, LP, of Bridgeport, N.J. Safelok1 fasteners can be found by determining the split or separation between the fasteners themselves. Safelok3 fasteners can found by determining the split or separation between the fasteners themselves for the end closest to the rail bottom.

Finally, the system disclosed herein can also detect clip-type fasteners for concrete ties like those manufactured by Vossloh AG of Werdohl, Germany. The Vossloh-type fasteners are somewhat similar to the Pandrol roll-formed fasteners mentioned above, and can be found by locating the main center bolt holding the fastener down, and then looking for the high ends of the fastener both up and down track. The system can identify and report all of the above features and adjust tie counts for tie replacement, or simply compile an inventory of found or missing parts per unit or track length.

Although various embodiments have been shown and described, the invention is not so limited and will be understood to include all such modifications and variations as would be apparent to one skilled in the art. For example, although the embodiments disclosed herein have been applied to railroad track beds, the present invention may also be utilized to inspect a variety of other surfaces such as roads, sidewalks, tree/forests, crops, bridges, building foundations, cars moving down the highway underneath an inspection system, or any variety of 3-D shapes one may desire to inspect and/or measure. Accordingly, the invention is not to be restricted except in light of the attached claims and their equivalents.

It is to be understood that the above-referenced arrangements are illustrative of the application of the principles of the present invention. It will be apparent to those of ordinary skill in the art that numerous modifications can be made without departing from the principles and concepts of the invention as set forth in the claims.

What is claimed is:

1. A system for inspecting railroad ties in a railroad track, comprising:
 a. a light generator, oriented to project a beam of light across the railroad track while moving along the railroad track in a travel direction;
 b. an optical receiver, oriented to receive at least a portion of the beam of light reflected from the railroad track and configured to generate image data representative of a profile of at least a portion of the railroad track; and
 c. a processor, configured to analyze the image data by applying one or more algorithms configured to:
  i. find boundaries of a railroad tie; and
  ii. determine one or more condition metrics associated with the railroad tie;

wherein the processor comprises a machine vision algorithm for finding the boundaries of the railroad tie, the algorithm configured to:
  a. identify regions of the image data that are smooth relative to surrounding regions, relative to a smoothness threshold;
  b. find at least two edges of a smooth region, oriented approximately perpendicular to the travel direction;
  c. identify two of the found edges which are spaced apart by approximately a width of a tie as the first and second edges; and
  d. identify the first and second edges as the boundaries of the railroad tie.

2. A system in accordance with claim 1, wherein the machine vision algorithm is further configured to:
  a. identify regions that include rails, tie plates and/or fasteners;
  b. find third and fourth edges of the smooth region, approximately perpendicular to and adjacent to the first and second edges, located outside of the rail, tie plate and/or fastener region, on opposing sides of the track; and
  c. identify the first through fourth edges as the boundaries of the railroad tie.

3. A system in accordance with claim 1, wherein at least a portion of the smooth region inside the tie boundaries is identified as a tie surface area.

4. A system in accordance with claim 1, wherein regions that do not satisfy the smoothness threshold and areas physically above the smooth region are identified as non-tie surfaces.

5. A system in accordance with claim 4, wherein the non-tie surfaces are filtered out, and not considered when determining the condition of the railroad tie.

6. A system in accordance with claim 4, wherein the tie surface area is normalized by a quantity of non-tie surface area within the tie boundaries.

7. A system in accordance with claim 4, wherein ties having a quantity of non-tie surface area above a threshold are identified as ties that cannot be graded.

8. A system in accordance with claim 1, wherein the processor is further configured to:
  a. determine a tie-to-tie distance between the tie and a next adjacent tie;
  b. compare the tie-to-tie distance to an expected tie-to-tie distance;
  c. determine that a tie is missing or covered if the tie-to-tie distance is too large, and/or determine that a phantom tie has been identified if the tie-to-tie distance is too small.

9. A system in accordance with claim 8, wherein the processor is further configured to:
  a. identify an initially missed tie by reanalyzing areas in which the tie-to-tie distance is too large, to find edges of smooth areas based upon an adjusted smoothness threshold, and/or determine which adjacent area is a phantom tie by comparing adjacent areas in which the tie-to-tie distance is too small.

10. A system in accordance with claim 1, wherein the processor is further configured to:
  a. move ahead to a new portion of the image data, after the tie is identified, to a next expected tie location, based upon an expected tie-to-tie distance; and
  b. search the new portion of the image data to identify a new smooth region based upon the smoothness threshold.

11. A system in accordance with claim 10, wherein the processor is further configured to:
  a. search forward and backward in the new portion of the image data relative to the next expected tie location, to identify the new smooth region; and
  b. increase the smoothness threshold with increased distance from the next expected tie location.

12. A system in accordance with claim 10, wherein the processor is further configured to determine that a tie is missing or covered if no new smooth region is found within about two times the expected tie-to-tie distance.

13. A system for inspecting railroad ties in a railroad track, comprising:
  a. a light generator, oriented to project a beam of light across the railroad track while moving along the railroad track in a travel direction;
  b. an optical receiver, oriented to receive at least a portion of the beam of light reflected from the railroad track and configured to generate image data representative of a profile of at least a portion of the railroad track; and
  c. a processor, configured to analyze the image data by applying one or more algorithms configured to:
    i. find boundaries of a railroad tie; and
    ii. determine one or more condition metrics associated with the railroad tie;
wherein the processor is further configured to apply an algorithm for finding tie plates, the algorithm configured to:
  a. find objects that are of tie plate size in a suspected general location where a plate should be;
  b. eliminate known non-plate objects based on position and size properties; and
  c. apply an edge-finding subroutine to enhance an outside edge of the tie plate;
wherein the edge-finding subroutine is configured to:
  a. identify a pixel as a plate pixel in a plate blob;
  b. stair-step through pixels to determine if they are connected to the current pixel; and
  c. identify the "connected" pixels as representing the presence of an edge.

14. A system in accordance with claim 13, wherein the processor is further configured to separate the tie plate from the tie to accommodate height differential.

15. A system in accordance with claim 13, wherein the processor is further configured to apply an algorithm for identifying a type of the tie plates, the algorithm configured to:
  a. determine a horizontal slope of the tie plate;
  b. determine the first and second derivatives of the horizontal slope;
  c. identify the tie plate as a spike plate if the slope has a negative first derivative; and
  d. identify the tie plate as a rolled/elastic-fastener tie plate if the slope has a negative second derivative.

16. A system in accordance with claim 15, wherein the processor is further configured to:
  a. search vertically across the tie plate shape to verify that the tie plate extends across a vertical span of the plate if a rolled/elastic-fastener tie plate was identified;
  b. identify a pixel as a plate pixel on an outside of the rolled/elastic-fastener tie plate;
  c. stair-step through pixels to determine if they are connected to the identified pixel; and
  d. identify the connected pixels as representing the presence of an edge.

17. A system in accordance with claim 13, wherein the processor is further configured to apply an algorithm for measuring tie plate cut, the algorithm configured to:
  a. find at least one region inside the outside edge of the tie plate;

b. find at least one region outside the outside edge of the tie plate and atop a tie surface area;
c. determine an apparent tie plate thickness as an elevation difference between the at least one region inside the outside edge of the tie plate and the at least one region outside the outside edge of the tie plate; and
d. subtract the apparent tie plate thickness from a known thickness of the plate to determine the tie plate cut.

18. A system in accordance with claim 1, wherein the processor is further configured to:
a. apply a weight factor to each condition metric of the railroad tie; and
b. compute a condition grade for the tie based on the weighted condition metrics.

19. A system in accordance with claim 18, wherein the condition grade is adjusted by a normalized tie surface area.

20. A system in accordance with claim 18, wherein the tie condition grade, tie location and spacing between ties with a tie condition grade above or below a grade threshold are correlated to create a tie replacement plan.

21. A system in accordance with claim 18, wherein the processor is further configured to:
a. determine GPS and heading information of a position of the railroad tie along a railroad track bed; and
b. adjust the condition grade of the tie based upon a degree of track curvature.

22. A system in accordance with claim 18, wherein the processor is further configured to:
a. locate a rail joint and/or weld near the tie; and
b. adjust the condition grade of the tie for higher degradation rates near the rail joint and/or weld.

23. A system in accordance with claim 1, wherein the condition metrics include at least one of: tie warpage, tie surface roughness, tie condition, tie entropy, tie heuristics, tie length, tie width, tie skew angle, tie plate cut, differential plate cut, spike height, depth of adzing, broken condition, curvature, tonnage, speed and decay zone.

24. A system in accordance with claim 1, wherein the light generator and the optical receiver are attached to a rail vehicle configured for travel along the railroad track in the travel direction.

25. A system in accordance with claim 1, wherein the processor is further configured to:
a. determine a location of the railroad tie with respect to a railroad track bed; and
b. correlate the tie location with GPS and/or milepost location.

26. A system in accordance with claim 1, wherein the processor is further configured to identify un-ballasted bridge ties, the algorithm configured to:
a. identify regions in the image data in which there are voids or shadows between multiple adjacent ties;
b. determine that a tie-to-tie distance between the multiple adjacent ties is consistent with an expected un-ballasted bridge tie spacing; and
c. identify an un-ballasted bridge location as a contiguous section of ties defined by a first and a last of the multiple adjacent ties.

27. A system in accordance with claim 1, wherein the processor is further configured to identify at least one of a fastener type, the start and end of a road/rail crossing at grade, a switch, switch points, switch ties, switch frogs and joint bars.

28. A system in accordance with claim 27, wherein the processor is further configured to adjust tie counts, and/or compile an inventory of found or missing parts per unit of track length.

* * * * *